US010743186B2

(12) United States Patent
Sui et al.

(10) Patent No.: US 10,743,186 B2
(45) Date of Patent: Aug. 11, 2020

(54) WIRELESS DEVICE, NETWORK NODE AND METHODS IN A WIRELESS COMMUNICATION SYSTEM

(71) Applicant: Telefonaktiebolaget LM Ericsson (publ), Stockholm (SE)

(72) Inventors: Yutao Sui, Solna (SE); Ansuman Adhikary, Hyderabad (IN); Johan Bergman, Stockholm (SE); Yufei Blankenship, Kildeer, IL (US); Asbjörn Grövlen, Stockholm (SE); Xingqin Lin, Santa Clara, CA (US); Hazhir Shokri Razaghi, Solna (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/085,787

(22) PCT Filed: Mar. 16, 2017

(86) PCT No.: PCT/SE2017/050260
§ 371 (c)(1),
(2) Date: Sep. 17, 2018

(87) PCT Pub. No.: WO2017/160222
PCT Pub. Date: Sep. 21, 2017

(65) Prior Publication Data
US 2019/0053061 A1  Feb. 14, 2019

Related U.S. Application Data

(60) Provisional application No. 62/309,433, filed on Mar. 16, 2016.

(51) Int. Cl.
*H04W 16/10* (2009.01)
*H04L 5/00* (2006.01)
(Continued)

(52) U.S. Cl.
CPC .......... *H04W 16/10* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS

2011/0268101 A1* 11/2011 Wang .................... H04L 5/0053
370/344
2013/0202069 A1* 8/2013 Nilsson ............... H04L 27/2657
375/343

(Continued)

FOREIGN PATENT DOCUMENTS

WO    WO-2017123279 A1 *   7/2017   ............ H04L 5/005

OTHER PUBLICATIONS

3rd Generation Partnership Project, "3rd Generation Partnership Project; Technical Specification Group Radio Access Network; Evolved Universal Terrestrial Radio Access (E-UTRA); Physical channels and modulation (Release 13)", Technical Specification, 3GPP TS 36.211 V13.0.0, Dec. 1, 2015, pp. 1-141, 3GPP.

(Continued)

*Primary Examiner* — Chi H Pham
*Assistant Examiner* — Vladislav Y Agureyev
(74) *Attorney, Agent, or Firm* — Coats & Bennett, PLLC

(57) ABSTRACT

Embodiments herein relate for example to a method performed by a wireless device in a first wireless communication system that is deployed on a frequency resource. The wireless device receives information indicating a PRB offset and a corresponding channel raster offset. The channel raster offset is an offset in frequency between a channel raster, used by the wireless device (105) in a cell search process, and the frequency resource. The PRB offset indicates an offset
(Continued)

between the frequency resource and an inner frequency resource on which a second wireless communication system is deployed. In the frequency domain, the second wireless communication system is deployed on at least one higher frequency resource above the inner frequency resource and at least one lower frequency resource below the inner frequency resource. The wireless device determines, based on the received information, an adjustment in frequency applicable for the frequency resource on which the first wireless communication system is deployed.

22 Claims, 23 Drawing Sheets

(51) Int. Cl.
*H04L 27/26* (2006.01)
*H04W 56/00* (2009.01)
*H04W 72/04* (2009.01)
*H04W 4/70* (2018.01)

(52) U.S. Cl.
CPC .......... *H04L 5/0048* (2013.01); *H04L 5/0091* (2013.01); *H04L 27/2657* (2013.01); *H04W 56/0025* (2013.01); *H04W 72/0446* (2013.01); *H04W 72/0453* (2013.01); *H04L 5/005* (2013.01); *H04L 5/0062* (2013.01); *H04W 4/70* (2018.02)

(56) References Cited

U.S. PATENT DOCUMENTS

| | | | |
|---|---|---|---|
| 2017/0094621 A1* | 3/2017 | Xu | H04W 56/001 |
| 2017/0208592 A1* | 7/2017 | Alvarino | H04W 4/70 |
| 2017/0223648 A1* | 8/2017 | Shin | H04W 56/005 |
| 2017/0251443 A1* | 8/2017 | Shin | H04L 5/001 |
| 2017/0265156 A1* | 9/2017 | Xue | H04L 5/0092 |
| 2018/0255524 A1* | 9/2018 | Wu | H04W 56/00 |
| 2018/0317185 A1* | 11/2018 | Chen | H04W 72/04 |
| 2018/0376436 A1* | 12/2018 | Wolff | H04L 5/0048 |

OTHER PUBLICATIONS

Ericsson, "NB-IoT-Synchronization Channel Evaluations", 3GPP TSG-RAN WG1 NB-IOT AdHoc, Budapest, Hungary, Jan. 18, 2016, pp. 1-6, R1-160080, 3GPP.
Ericsson, "NB-IoT Channel Raster", 3GPP TSG-RAN1 NB-IOT Ad Hoc, Budapest, Hungary, Jan. 18, 2016, pp. 1-3, R1-160082, 3GPP.
Wi Rapporteus (Ericsson), "RAN1 agreements for Rel-13 NB-IoT", St. Julian's, Malta, Feb. 15, 2016, pp. 1-11, R1-161548, 3GPP.
Huawei, "Revised Work Item: Narrowband IoT (NB-IoT)", 3GPP TSG RAN Meeting #70, Sitges, Spain, Dec. 7, 2015, pp. 1-9, RP-152284, 3GPP.
Huawei, "Channel raster design", 3GPP TSG RAN WG1 NB-IoT Ad-Hoc Meeting, Budapest, Hungary, Jan. 18, 2016, pp. 1-5, R1-160022, 3GPP.
Interdigital, "MIB Contents for NB-IoT", 3GPP TSG RAN WG1 Meeting #84, St Julian's, Malta, Feb. 15, 2016, pp. 1-3, R1-160918, 3GPP.
Huawei, "Synchronization signal evaluation", 3GPP TSG RAN WG1 NB-IoT Ad-Hoc Meeting, 3GPP TSG RAN WG1 NB-IoT Ad-Hoc Meeting, Jan. 18, 2016, pp. 1-7, R1-160021, 3GPP.
Ericsson, "NB-IoT—Remaining issues for NPBCH and MIB", 3GPP TSG RAN WG1 NB-IoT Ad-Hoc Meeting, Sophia Antipolis, Mar. 22, 2016, pp. 1-6, R1-161820, 3GPP.
Ericsson, "NB-IoT—NB-MIB content and design considerations", 3GPP TSG-RAN1#84, St. Julian, Malta, Feb, 15, 2016, pp. 1-4, R1-160440, 3GPP.

* cited by examiner

WIRELESS DEVICE, NETWORK NODE AND METHODS IN A WIRELESS COMMUNICATION SYSTEM

TECHNICAL FIELD

The present disclosure relates generally to the field of communications, and in particular to a wireless device, a network node and methods performed in a first wireless communication system. Furthermore, a computer program and a computer readable storage medium are also provided herein.

BACKGROUND

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

Cellular communication systems are currently being developed and improved for machine type communication (MTC), which is a type of communication characterized by lower demands on data rates than for example mobile broadband, but with higher requirements on e.g. low cost device design, better coverage, and ability to operate for years on batteries without charging or replacing the batteries. Currently, Third Generation Partnership Project (3GPP) is standardizing a feature called Narrowband Internet of Things (NB-IoT) for satisfying all the requirements put forward by MTC type applications, while maintaining backward compatibility with the current Long Term Evolution (LTE) radio access technology. A new work item named Narrowband IoT (NB-IoT) has been approved in 3GPP where the objective is to specify a radio access for cellular internet of things that addresses improved indoor coverage, support for massive number of low throughput devices, low delay sensitivity, ultra-low device cost, low device power consumption and (optimized) network architecture.

NB-IoT systems have three different deployment modes, i.e., stand-alone, guard-band, and in-band. In stand-alone mode, the NB-IoT system is operated in dedicated frequency bands. For in-band operation, the NB-IoT system can be placed inside the frequency bands used by the current LTE system by using one or several LTE Physical Resource Block (PRB) for NB-IoT systems, while in the guard-band mode, the NB-IoT system can be placed in the frequency band used as guard band by the current LTE system. The NB-IoT has a system bandwidth of 180 kHz.

A channel raster of e.g. the downlink (DL) of NB-IoT systems is on a frequency grid of 100 kHz, also denoted cell search grid. That is, the NB-IoT devices try to find the NB-IoT carriers in a step size of 100 kHz. For the standalone deployment, this is fine. But for the in-band and guard-band operation, as observed in R1-160082, NB-IoT Channel Raster, source Ericsson, 3GPP TSG-RAN1 NB-IOT Ad Hoc 18-20 Jan. 2016, Budapest, Hungary, there is no LTE PRB that can be used for NB-IoT deployment that falls directly on the cell search grid used for NB-IoT in LTE in-band operation. The frequency offset to the 100 kHz grid is a minimum of ±2.5 kHz and ±7.5 kHz for even and odd number of PRBs in the LTE system bandwidth, respectively (see R1-160082, NB-IoT Channel Raster, source Ericsson, 3GPP TSG-RAN1 NB-IOT Ad Hoc 18-20 Jan. 2016, Budapest, Hungary). The ±2.5 kHz or ±7.5 kHz can be handled by the wireless device during the cell search process and then compensated for. However, these channel raster offsets constrain the positions where NB-IoT carriers can be deployed for the in-band and guard-band operations.

For the guard-band operation, for an LTE system with 10 or 20 MHz system bandwidth, it is possible to find e.g. NB-IoT downlink carrier frequency that is 2.5 kHz off the 100 kHz channel raster. For other LTE system bandwidths, the offset to the 100 kHz raster is 52.5 kHz. Therefore, in order to get within the same ±7.5 kHz to the 100 kHz grid, 3 guard subcarriers are needed. One guard carrier is of a 15 kHz width and placed in the same Fast Fourier Transform (FFT) grid at the legacy LTE system that gives orthogonality to the legacy LTE PRB. However, there are no other solutions to put the NB-IoT carriers on the exact 100 kHz raster grids in the LTE guard-band without losing orthogonality to the legacy LTE system. If an NB-IoT system is deployed in the guard-band of an LTE system and not orthogonal to the LTE subcarriers, e.g., to fulfill the 100 kHz channel raster requirement, the existing solution is either to transmit the NB-IoT carrier at a lower power or to use stringent channel filters to ensure that the LTE spectrum mask, which regulates out of band emission levels, is not violated and that there is no significant interference between the NB-IoT system and the LTE system.

Thus, it may be rather resource consuming or resource inefficient, according to prior art, to enable the wireless device to use a first wireless communication system, such as an NB-IoT system, that is deployed together with a second wireless communication system such as a LTE system.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

An object of embodiments herein is to enable or enhance possibility for a wireless device to use a first wireless communication system that is deployed together with a second wireless communication system in an efficient manner. A further object of embodiments herein is to enable or enhance possibility for a wireless device to use a Narrowband Internet of Things (NB-IoT) system that is deployed together with a Long Term Evolution (LTE) system in an efficient manner.

The object is achieved by providing a method performed by a wireless device in a first wireless communication system that is deployed on a frequency resource. The wireless device receives information indicating a physical resource block (PRB) offset and a corresponding channel raster offset. The channel raster offset is an offset in frequency between a channel raster, used by the wireless device in a cell search process, and the frequency resource, and the PRB offset indicates an offset between the frequency resource and an inner frequency resource on which a second wireless communication system is deployed. In the frequency domain, the second wireless communication system is deployed on at least one higher frequency resource above the inner frequency resource and at least one lower frequency resource below the inner frequency resource. The wireless device further determines, based on the received information, an adjustment in frequency applicable for the frequency resource on which the first wireless communication system is deployed.

The object is further achieved by providing a method performed by a network node in a first wireless communication system that is deployed on a frequency resource. The network node transmits information indicating a PRB offset and a corresponding channel raster offset. The channel raster offset is an offset in frequency between a channel raster, used by the wireless device in a cell search process, and the frequency resource, and the PRB offset indicates an offset between the frequency resource and an inner frequency resource on which a second wireless communication system is deployed. In the frequency domain, the second wireless communication system is deployed on at least one higher frequency resource above the inner frequency resource and at least one lower frequency resource below the inner frequency resource.

It is herein also provided a computer program comprising instructions, which, when executed on at least one processor, causes the at least one processor to carry out the methods herein, as performed by the wireless device or the network node. Furthermore, it is herein provided a computer-readable storage medium, having stored there on a computer program comprising instructions which, when executed on at least one processor, cause the at least one processor to carry out the methods herein, as performed by the wireless device or the network node.

The object is further achieved by providing a wireless device for a first wireless communication system that is deployed on a frequency resource. The wireless device is configured to receive information indicating a PRB offset and a corresponding channel raster offset. The channel raster offset is an offset in frequency between a channel raster, used by the wireless device in a cell search process, and the frequency resource. The PRB offset indicates an offset between the frequency resource and an inner frequency resource on which a second wireless communication system is deployed. In the frequency domain, the second wireless communication system is deployed on at least one higher frequency resource above the inner frequency resource and at least one lower frequency resource below the inner frequency resource. The wireless device is further configured to determine, based on the received information, an adjustment in frequency applicable for the frequency resource on which the first wireless communication system is deployed.

The object is further achieved by providing a network node for a first wireless communication system that is deployed on a frequency resource. The network node is configured to transmit information indicating a PRB offset and a corresponding channel raster offset. The channel raster offset is an offset in frequency between a channel raster, used by a wireless device in a cell search process, and the frequency resource. The PRB offset indicates an offset between the frequency resource and an inner frequency resource on which a second wireless communication system is deployed. In the frequency domain, the second wireless communication system is deployed on at least one higher frequency resource above the inner frequency resource and at least one lower frequency resource below the inner frequency resource.

Embodiments herein disclose an efficient manner of enabling a wireless device to determine and use, for communication in a first wireless communication system, a frequency resource of the first wireless communication system that is deployed together with a second wireless communication system, e.g. by being deployed in the guard band or in-band of the second wireless communication system. The manner whereby the wireless device is enabled to determine and use the frequency resource is efficient in that information, transmitted by the network node and received by the wireless device for determining the location of the frequency resource, is independent of the bandwidth of the second wireless communication system. It is further efficient in that, according to at least some embodiments, the information transmitted by the network node indicates, to the wireless device, an adjustment in frequency, e.g. for determining the frequency resource, by indicating, e.g. in form of an index, to the wireless device, the PRB offset, e.g. in numbers of PRBs, and the corresponding channel raster offset. In other words, the transmitted information jointly indicates the PRB offset and the corresponding channel raster offset. This will result in a resource efficient signaling enabling the wireless device to use the first wireless communication system that is deployed together with the second wireless communication system.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1A:
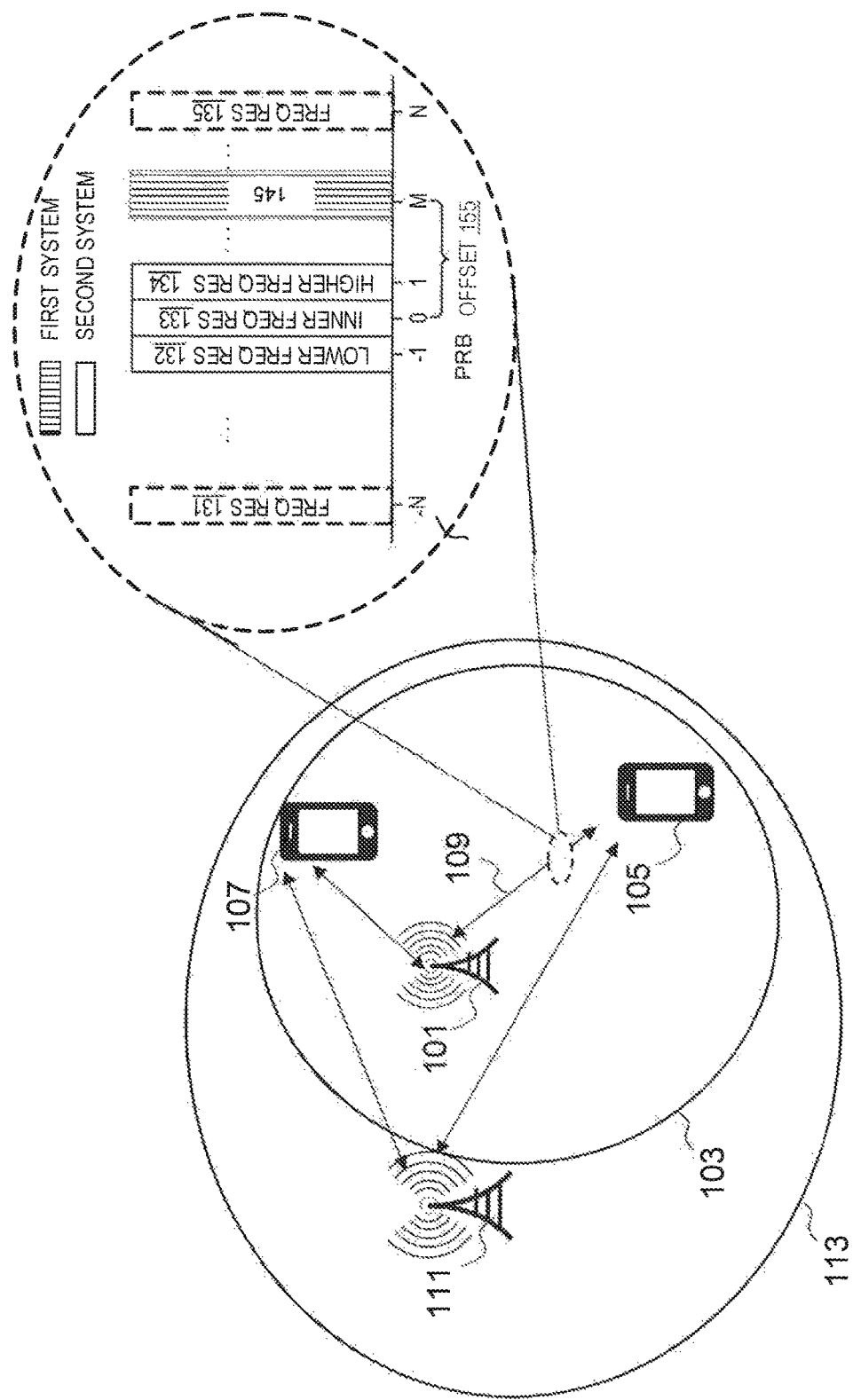
FIG. 1a illustrates an embodiment of a system for deploying a frequency resource for a first wireless communication system or network according to embodiments herein.

FIG. 1*a* illustrates a first wireless communication system and a second wireless communication system, e.g., served by one or more first and second network nodes that may be the same or different network nodes. The first wireless communication system, e.g., a Narrowband Internet of Things (NB-IoT) system, is deployed on one or more frequency resources, including a frequency resource 145. In one example, the frequency resource 145 may be a range of contiguous frequencies, a physical resource block (PRB), or the like. In another example, the frequency resource 145 may be a single subcarrier, multiple contiguous subcarriers, or the like. The second wireless communication system, e.g., wideband LTE system, is deployed on one or more frequency resources 131-135. These frequency resources 131-135 include a so-called inner frequency resource 133 as well as at least one higher frequency resource 134 and at least one lower frequency resource 132. The at least one higher frequency resource 134 is above the inner frequency resource 133 in the frequency domain, whereas the at least one lower frequency resource 132 is below the inner frequency resource 133 in the frequency domain. The inner frequency resource 133 in this regard may be flanked on either side in the frequency domain with another frequency resource on which the second wireless communication system is deployed. In other words, the at least one higher frequency resource 134 may be of a higher frequency than the frequency of the inner frequency resource 133 and/or the at least one lower frequency resource 132 may be of a lower frequency than the frequency of the inner frequency resource 133. Thus, in some embodiments, the second wireless communication system is deployed on frequency resources comprising the inner frequency resource 133 and the at least one higher frequency resource 134 above the inner frequency resource and the at least one lower frequency resource 132 below the inner frequency resource 133. In other words, the second wireless communication system in these embodiments uses frequency resources comprising the inner frequency resource 133 and the at least one higher frequency resource 134 above the inner frequency resource and the at least one lower frequency resource 132 below the inner frequency resource 133. It should be noted that where the term "wireless communication system" is used herein to denote entities or structures, the term "wireless communication network" is equally applicable, and can be used as an alternative term. It should further be noted that the expression "an offset between item X and item Y" as used herein for simplicity regarding a channel raster offset and a PRB offset, such as the offset 155 in FIG. 1*a*, should be taken to mean "an offset by which item X is offset from item Y", or as the case may be "an offset by which item Y is offset from item X", or equivalently "an offset from item X to item Y". In other words, the sentence "The channel raster offset is an offset in frequency between a channel raster, used by the wireless device in a cell search process, and the frequency resource, and the PRB offset indicates an offset between the frequency resource and an inner frequency resource on which a second wireless communication system is deployed" should be understood to mean "The channel raster offset is an offset in frequency from a channel raster, used by the wireless device in a cell search process, to the frequency resource, and the PRB offset indicates an offset by which the frequency resource is offset from an inner frequency resource on which a second wireless communication system is deployed".

In some embodiments, the second wireless communication system may be deployed on one or more other frequency resources in addition to one or more lower, inner, and higher resources 132-134. As shown, for example, the second wireless communication system may be deployed also on an additional lower frequency resource 131 and/or an additional higher frequency resource 135. In view of these and other embodiments, therefore, the first wireless communication system is in some embodiments deployed in-band of the second wireless communication system. In other embodiments, though, the first wireless communication system may be deployed in a guard band of the second wireless communication system. In still other embodiments, the first wireless communication system may be deployed outside any band of the second wireless communication system, e.g., in a standalone way.

Irrespective of how or where the first wireless communication system and the second wireless communication system are deployed relative to one another, one or more embodiments herein enable and/or enhance communication of the wireless device in the first wireless communication system by enabling determination of the frequency resource 145 on which the first wireless communication system is deployed. This determination may involve for example determining the location of frequency resource 145 in the frequency domain, e.g., in terms of an index mapped to the frequency resource 145, where different indices are mapped to different frequency resources e.g. in terms of PRBs.

Some embodiments herein may relate to deployment of an NB-IoT system in an environment where also an LTE system is deployed, i.e., the NB-IoT system can be deployed within the LTE system or in the guard-band used by the LTE system. The NB-IoT system may be deployed for in-band, guard-band or stand-alone operation. For all deployment modes, a 100 kHz channel raster will be used by wireless devices trying to find the NB-IoT carriers, e.g. in a cell search process. Due to the presence of a Direct Current (DC)-carrier in an LTE system and its position as well as the size of an LTE PRB in frequency domain, i.e., 180 kHz, none of the center frequencies of the LTE PRBs fall directly on the cell search grid of the 100 kHz channel raster for NB-IoT in-band deployment. The channel raster offset to a 100 kHz grid of the channel raster is a minimum of ±2.5 kHz for even number of PRBs in the LTE system bandwidth, and ±7.5 kHz for odd number of PRBs in the LTE system bandwidth. As stated above the ±2.5 kHz or ±7.5 kHz can be handled by the wireless device during the cell search process and then be compensated for. However, these channel raster offsets constrain the positions where NB-IoT anchor carriers can be deployed for the in-band and guard-band operations.

In one example embodiment discussed herein, a wireless device 105, such as a user equipment (UE), may obtain the information indicating an offset 155 such as by receiving the information from a network node 101. The wireless device 105 may then determine, based on the offset 155 and the inner frequency resource 133 of the second wireless communication system, the frequency resource 145 on which the first wireless communication system is deployed.

According to further embodiments herein the wireless device 105 receives information indicating a PRB offset, represented by the offset 155. As will be explained in the following, the received information also indicates a corresponding channel raster offset. The channel raster offset is an offset in frequency between a channel raster, used by the wireless device 105 in the cell search process, and the frequency resource 145, e.g. the center of the frequency resource in case the frequency resource is e.g. a PRB. The PRB offset indicates an offset between the frequency resource 145 and the inner frequency resource 133 on which the second wireless communication system is deployed, which inner frequency resource 133 is thus used by the second wireless communication system. In the frequency domain, the second wireless communication system is deployed on the at least one higher frequency resource 134 above the inner frequency resource 133 and the at least one lower frequency resource 132 below the inner frequency resource 133. The PRB offset may be expressed as a number of PRBs between the frequency resource 145 and the inner frequency resource 133, with a positive sign for the PRB offset when the frequency resource 145 is a higher frequency resource than the frequency resource 133, and a negative sign for the PRB offset when the frequency resource 145 is a lower frequency resource than the inner frequency resource 133. The channel raster offset also has a sign and an absolute value. The absolute value of the channel raster offset is related to and determined by whether there is an odd or even number of PRBs spanning the system bandwidth of the second wireless communication system and the sign of the channel raster offset is related to and derivable from the sign of the PRB offset. The relation between the sign of the channel raster offset and the sign of the PRB offset is also related to and determined by whether there is an odd or even number of PRBs spanning the system bandwidth of the second wireless communication system. The information indicating the PRB offset may therefore, by being dependent on whether there is an odd or even number of PRBs spanning the system bandwidth of the second wireless communication system and through the relation between the sign of the PRB offset and the sign of the channel raster offset, also indicate the absolute value and sign of the channel raster offset.

The wireless device 105 further determines, based on the received information, an adjustment in frequency applicable for the frequency resource 145 on which the first wireless communication system is deployed. The adjustment in frequency corresponds to the channel raster offset between a grid point of the channel raster used by the wireless device 105 in the cell search process and the frequency resource 145. The adjustment in frequency is needed for the wireless device 105 to enable communication with the first wireless communication system after that the grid point of the channel raster has been located during the cell search process, e.g. by the wireless device 105 having received a synchronization signal of the first wireless communication system on the frequency represented by the located grid point. For example, the wireless device 105 may determine the adjustment in frequency to be −7.5 kHz when the sign of the PRB offset is negative and +7.5 kHz when the sign of the PRB offset is positive in a situation when the received information indicating the PRB offset is based on that the second wireless communication system has a system bandwidth spanning an odd number of PRBs. Furthermore, in a situation when the received information indicating the PRB offset is based on that the second wireless communication system has a system bandwidth spanning an even number of PRBs, the wireless device 105 may determine the adjustment in frequency to be +2.5 kHz when the sign of the PRB offset is negative and −2.5 kHz when the sign of the PRB offset is positive.

Alternatively described, according to the above referenced further embodiments, the wireless device 105, such as a user equipment (UE), thus receives information indicating the PRB offset, represented by the offset 155. The information indicating the PRB offset is based on whether there is an odd or even number of PRBs spanning a system bandwidth of a second wireless communication system. The PRB offset indicates the offset between the frequency resource 145 on which the first wireless communication system is deployed and the inner frequency resource 133 on which the second wireless communication system is deployed. The inner frequency resource 133 is thus used by the second wireless communication system and the frequency resource 145 is used by the first wireless communication system. In the frequency domain, the second wireless communication system is further deployed on the at least one higher frequency resource 134 above the inner frequency resource 133 and the at least one lower frequency resource 132 below the inner frequency resource 133. The PRB offset has a sign that is positive when the frequency resource 145 is a higher frequency resource than the inner frequency resource 133, and negative when the frequency resource 145 is a lower frequency resource than the inner frequency resource 133. The wireless device 105 further determines, based on the received information, a channel raster offset that corresponds to the indicated PRB offset. The channel raster offset is the offset in frequency between the channel raster and the frequency resource 145 on which the first wireless communication system is deployed. The channel raster is used by the wireless device 105 in the cell search process searching for the first communication system. The channel raster offset corresponds to the PRB offset in that the channel raster offset indicates a frequency adjustment needed to be made by the wireless device 105 to tune to the carrier frequency of the first wireless communication system from the channel raster, e.g. from a grid point on the channel raster, when the first wireless communication system is deployed on the frequency resource 145 indicated by the PRB offset.

The PRB offset may e.g. be in form of an index for indexing a PRB. The index may be denoted PRB index and may indicate the PRB as the frequency resource 145 assigned to the first wireless communication system counted from the inner frequency 133. This indexing may be used both for indexing an anchor PRB signaled in a Master Information Block (MIB) of e.g. the NB-IoT system, and for indexing a non-anchor PRB for multi-carrier operations of e.g. NB-IoT systems. Using this way of indexing PRBs, the information indicating the PRB offset may be signaled in a manner that enables determination of the PRB, and the corresponding channel raster offset, without requiring signaling of the system bandwidth of the second wireless communication system, such as the LTE system bandwidth for the LTE system. Therefore, embodiments herein may be applied for all existing LTE system bandwidths, and be forward compatible if new LTE system bandwidths are defined in the future. For example, in embodiments where the second wireless communication system is the LTE system and where the information indicating the PRB offset is based on whether the LTE system bandwidth spans an even or odd number of PRBs, and where the sign of the PRB offset indicated by the signaled information is related to the sign of the channel raster offset, i.e. the sign of a frequency offset relative to the 100 kHz grid, the channel raster offset can be implicitly derived, from the signaled information, by the wireless device 105. The way to index the PRB further allows the wireless device 105 to derive LTE Cell Specific Reference Signal (CRS) information without using the LTE system bandwidth. For e.g. in-band operation the existing LTE CRSs can be used by the wireless device 105 during a channel estimation to improve the channel estimation. This also applies for the cases of multi-carrier operation of NB-IoT systems. Information to obtain CRS sequence may also be included in the MIB of the first wireless communication system, e.g. the NB-IoT system. For example, the MIB of the NB-IoT system may include an indication, e.g. in form of a same-PCI indicator, that the NB-IoT system and the LTE system are using a same Physical Cell Identifier (PCI) as well as the information indicating the PRB offset or PRB index. Thus, some embodiments herein enable the wireless device 105 to make use of CRS available within the second wireless communication system for improving channel estimation and/or demodulation for communication with the first wireless communication system.

Notably, one or more embodiments herein determine the frequency resource 145 on which the first wireless communication system is deployed based on or relative to a certain frequency resource(s) on which the second wireless communication system is deployed. In particular, the certain frequency resource(s) includes the so-called inner frequency resource 133 on which the second wireless communication system is deployed. The inner frequency resource 133 is "inner" in the sense that it is distinct from and inside of the outermost edge frequency resources that define or span the frequency bandwidth occupied by the second wireless communication system, e.g. in the middle of the frequency bandwidth occupied by the second wireless communication system. This means that the second wireless communication system is deployed on the at least one higher frequency resource 134 above the inner frequency resource 133 in the frequency domain, and is deployed on the at least one lower frequency resource 132 below the inner frequency resource 133 in the frequency domain. In this broad sense, therefore, there may be more than one frequency resource that qualifies as an inner frequency resource.

In any event, the frequency resource 145 on which frequency resource the first wireless communication system is deployed is offset 155 in frequency from the inner frequency resource 133, e.g., a given or predefined inner frequency resource. Embodiments herein exploit this offset in order to identify or otherwise determine the frequency resource 145 on which the first wireless communication system is deployed. This offset is denoted PRB offset herein and may be an offset in terms of a number of PRBs.

For example, in some embodiments, the wireless device 105 is configured to determine the PRB offset 155 between the frequency resource 145 on which the first wireless communication system is deployed and the inner frequency resource 133 on which the second wireless communication system is deployed. The wireless device 105 in this case determines the frequency resource 145 on which the first wireless communication system is deployed, based on the determined PRB offset relative the inner frequency resource 133. In fact, in one or more embodiments, the wireless device 105 determines this without knowledge of the frequency bandwidth of the second wireless communication system, i.e., the determination is not a function of the second wireless communication system's bandwidth. Accordingly, in some embodiments, the wireless device 105 may not need to be signaled the second wireless communication system's bandwidth as a prerequisite. Rather, the wireless device 105 is simply signaled the information indicating the PRB offset. This information may be signaled as information e.g. in the format of an index. The signaled information may further indicate, at least implicitly, the corresponding channel raster offset. The channel raster offset is the offset in frequency between the channel raster, which channel raster is used by the wireless device 105 in the cell search process, and the frequency resource 145. The wireless device 105 further determines, based on the received information, e.g. the received index, an adjustment in frequency applicable for the frequency resource on which the first wireless communication system is deployed. Thus, the wireless device 105 is enabled to use the first wireless communication system.

In one embodiment, the network node 101 such as a base station may assign, e.g. to the first wireless communication system, the frequency resource 145 on which the first wireless communication system is deployed. The first wireless communication system may be a narrowband communication system such as NB-IoT. The frequency resource 145 may be in-band, in a guard-band, or outside any band of the second wireless communication system. The network node 101 may determine the PRB offset 155 between the frequency resource 145 on which the first communication system is deployed and the inner frequency resource 133 on which the second wireless communication system is deployed. The network node 101 may further determine whether there is an odd or even number of PRBs spanning a system bandwidth of the second wireless communication system. The network node 101 may further determine the channel raster offset that corresponds to the determined PRB offset 155. The network node 101 may then generate, based on whether there is an odd or even number of PRBs spanning the system bandwidth of the second wireless communication system, information indicating the PRB offset. The information may for example be generated such that the information indicating the PRB offset, e.g. the above mentioned index, differs depending on whether there is an odd or even number of PRBs spanning a system bandwidth of a second wireless communication system. The generated information may further indicate, at least implicitly, the channel raster offset that corresponds to the PRB offset. The network node 101 transmits the information to the wireless device 105 to enable the wireless device 105 to determine the corresponding frequency resource 145.

The wireless device 105 may obtain the information indicating the offset 155 by receiving, from the network node 101, the information generated by the network node 101 based on whether there is an odd or even number of PRBs spanning the system bandwidth of the second wireless communication system. The wireless device 105 may then determine, based on the offset 155 from the inner frequency resource 133 of the second wireless communication system, the frequency resource 145 on which the first wireless communication system is deployed. The wireless device 105 may be determined in some embodiments the frequency resource 145 on which the first wireless communication system is deployed by determining, based on the information received from the network node 101, the channel raster offset that corresponds to the indicated offset 155.

The system may include the network node 101, also referred to as the first network node, with a first coverage area 103 and a second network node 111 with a second coverage area 113. The network node 101 may be configured to support the first wireless communication system. In one example, the first wireless communication system may be one or more narrowband communication systems such as an NB-IoT system. Further, the network node 101 may be a base station, an access point, a wireless router, or the like. The network node 101 may serve one or more wireless devices 105 and 107 via radio link interfaces such as radio link interface 109. The second network node 111 may be configured to support the second wireless communication system. In one example, the second wireless communication system may be one or more wideband communication systems such as LTE, New Radio (NR) or LTE-Next (NX), Universal Mobile Telecommunications System (UMTS), Global System for Mobile communications (GSM), or the like. Further, the second network node 111 may be a base station, an access point, a wireless router, or the like. The second network node 111 may also serve the wireless devices 105 and 107. The network node 101 and the second network node 111 may be the same network node or different network nodes and may communicate with each other over a link.

In another embodiment, the network node 101 may allow the wireless devices 105 and 107 to operate in different operation modes. The network node 101 may allow the wireless devices 105 and 107 to operate in standalone spectrum. In one example, the standalone spectrum may be a dedicated frequency spectrum of the first wireless communication system. Further, the network node 101 may allow the wireless devices 105 and 107 to operate in a guard band of the second wireless communication system corresponding to the second network node 111. In one example, the guard band may be a frequency spectrum that is in a guard band of a wideband communication system like that of the second wireless communication system. In another example, the guard band may be a frequency spectrum of a wideband communication system, like that of the second wireless communication system, which frequency spectrum is not in-band. Also, the first network node 101 may allow the wireless devices 105 and 107 to operate in-band of the second wireless communication system, such as a wideband communication system, corresponding to the second network node 111. In one example, the in-band may be a frequency spectrum in the operating band of a wideband communication system. In another example, the in-band may be frequency spectrum of a wideband communication system that is not a guard-band of the wideband communication system.

Figure 1B:
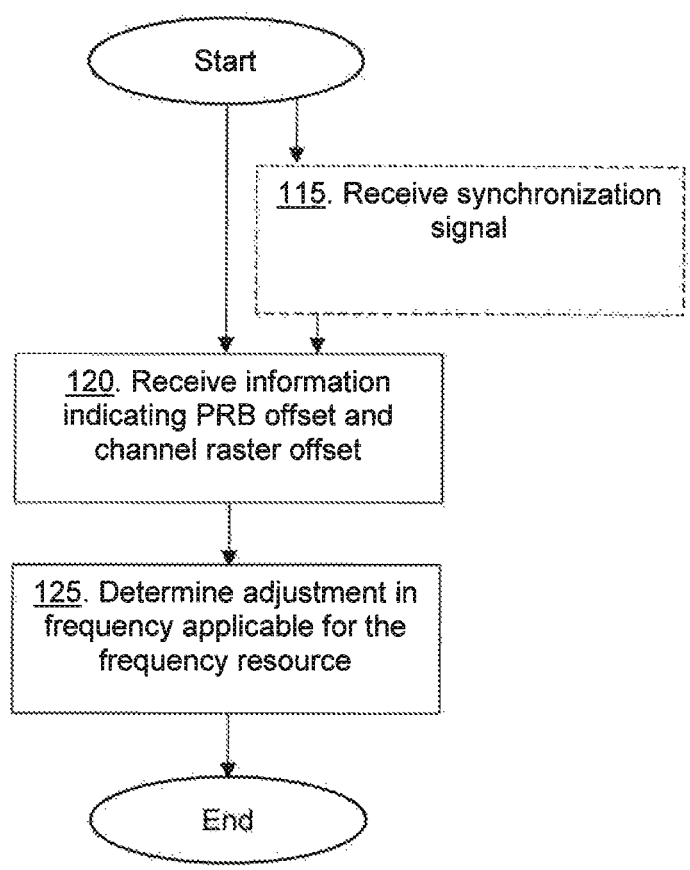
FIG. 1b illustrates a flowchart depicting a method performed by a wireless device according to embodiments herein.

The method actions performed by the wireless device 105 in the first wireless communication system that is deployed on the frequency resource according to some embodiments will now be described with reference to a flowchart depicted in FIG. 1b. Actions performed in some, but not necessarily all, embodiments are marked with dashed boxes. The method may be for enabling or enhancing communication in or with the first wireless communication system.

Action 115. The wireless device 105 may receive, during the cell search process using the channel raster, a synchronization signal of the first wireless communication network. The wireless device 105 may guess the channel raster offset, e.g. 2.5 kHz or 7.5 kHz, already when processing the received synchronization signal during the cell search. However, this needs to be confirmed later by signaling information indicating, at least implicitly, the channel raster offset. After being synchronized with the first wireless communication system by processing the synchronization signal or signals, the wireless device 105 receives the information as stated in action 120.

Action 120. The wireless device 105 receives information indicating the PRB offset and the corresponding channel raster offset. The channel raster offset is the offset in frequency between the channel raster, which channel raster is used by the wireless device 105 in the cell search process, and the frequency resource 145 on which the first wireless communication system is deployed. The PRB offset indicates the offset between the frequency resource 145 and the inner frequency resource 133 on which the second wireless communication system is deployed. In the frequency domain, the second wireless communication system is deployed on the at least one higher frequency resource 134 above the inner frequency resource 133 and the at least one lower frequency resource 132 below the inner frequency resource 133. The wireless device 105 may receive the information by receiving a MIB of the first wireless communication system, which MIB may comprise five bits indicating the PRB offset and, at least implicitly, the corresponding channel raster offset. Receiving the information enables the wireless device 105 to determine, based on the PRB offset, cell-specific reference signal (CRS) information of the second communication system and to use this information for improving channel estimation, and/or for demodulation, in the first wireless communication system. The received information may comprise an index indicating the PRB offset and, at least implicitly, the corresponding channel raster offset.

Action 125. The wireless device 105 determines, based on the received information, the adjustment in frequency applicable for the frequency resource 145 on which the first wireless communication system is deployed.

Since the PRB offset 155 is indicated relative to the inner frequency resource 133 there is no need to signal the system bandwidth. Therefore, it can be applied for all cases of system bandwidth, and be forward compatible if new and different system bandwidths are defined in the future.

In some embodiments the wireless device 105, for the first wireless communication system that is deployed on the frequency resource 145, receives (action 120) information indicating the PRB offset wherein the information indicating the PRB offset is based on whether there is an odd or even number of PRBs spanning a system bandwidth of the second wireless communication system. The PRB offset indicates the offset between the frequency resource 145 on which the first wireless communication system is deployed and the inner frequency resource 133 on which the second wireless communication system is deployed. In the frequency domain, the second wireless communication system is deployed on the at least one higher frequency resource 134 above the inner frequency resource 133 and the at least one lower frequency resource 132 below the inner frequency resource 133. The PRB offset has a sign that is positive when the frequency resource 145 is a higher frequency resource than the inner frequency resource 133, and negative when the frequency resource 145 is a lower frequency resource than the inner frequency resource 133.

Furthermore, the wireless device 105 may determine, based on the received information, a channel raster offset corresponding to the indicated PRB offset, wherein the channel raster offset is an offset in frequency between a channel raster, which channel raster is used by the wireless device 105 in a cell search process, and the frequency resource 145 on which the first wireless communication system is deployed.

Figure 1C:
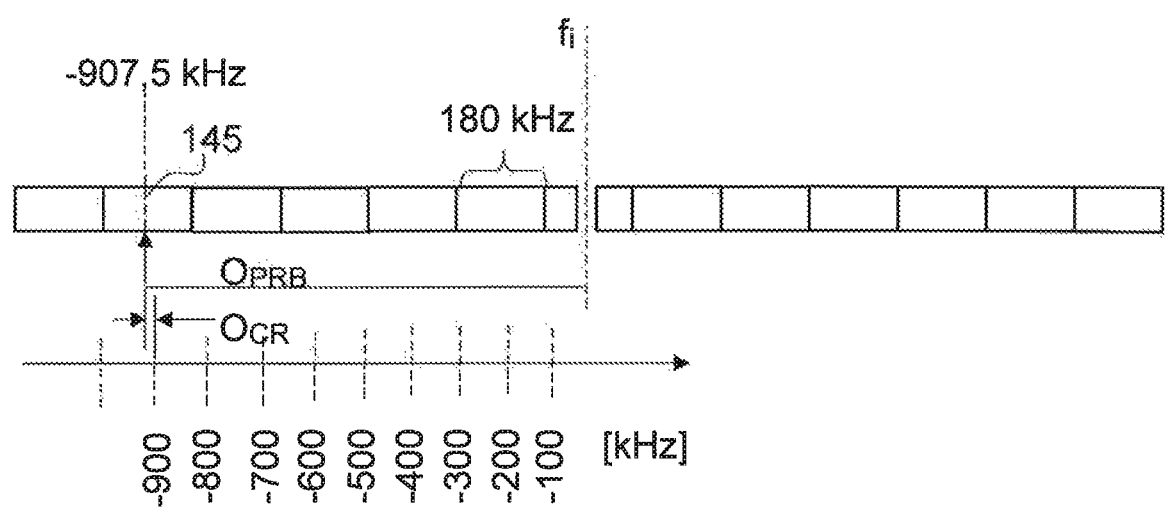
FIG. 1c is a schematic overview depicting PRB offset and channel raster offset according to embodiments herein.

FIG. 1c illustrates the PRB offset ($O_{PRB}$), analogous to offset 155 in FIG. 1, and channel raster offset ($O_{CR}$) for a first wireless system that is deployed on a frequency resource 145 within the frequency band of the second wireless communication system, for the case where the system bandwidth of the second wireless communication system comprises or spans an uneven number of PRBs. The channel raster grid is shown below the PRBs. In this example, each PRB has a width of 180 kHz in the frequency dimension. The PRB offset $O_{PRB}$ indicates the offset, e.g. in terms of number of PRBs, between a center frequency of the frequency resource 145, on which the first wireless communication system is deployed, and a middle frequency (fi), which is a DC carrier dividing the inner frequency resource 133 in two halves. The PRB offset $O_{PRB}$ is counted starting from the inner frequency resource 133. The channel raster offset $O_{CR}$ indicates the offset between the channel raster, used by the wireless device 105 in the cell search process, and the frequency resource 145, i.e. the offset in frequency (to the center frequency of the frequency resource 145) relative to a grid point on the channel raster. For example, the wireless device 105 performs a cell search process and receives a synchronization signal of the first communication system at a 900 kHz grid point of the channel raster. The wireless device 105 then receives information indicating the PRB offset $O_{PRB}$, e.g. a PRB offset of minus five, indicating that the first wireless communication system is deployed on PRB index minus five and that the channel raster offset is −7.5 kHz, since the channel raster offset that corresponds to PRB offset minus five, when the system bandwidth of the second communication system spans an odd number of PRBs, is −7.5 kHz. This may be retrieved from a table configured at the wireless device 105. Thus the wireless device 105 may tune to the frequency resource 145 on −907.5 kHz from the channel raster grid point −900 kHz.

Figure 1D:
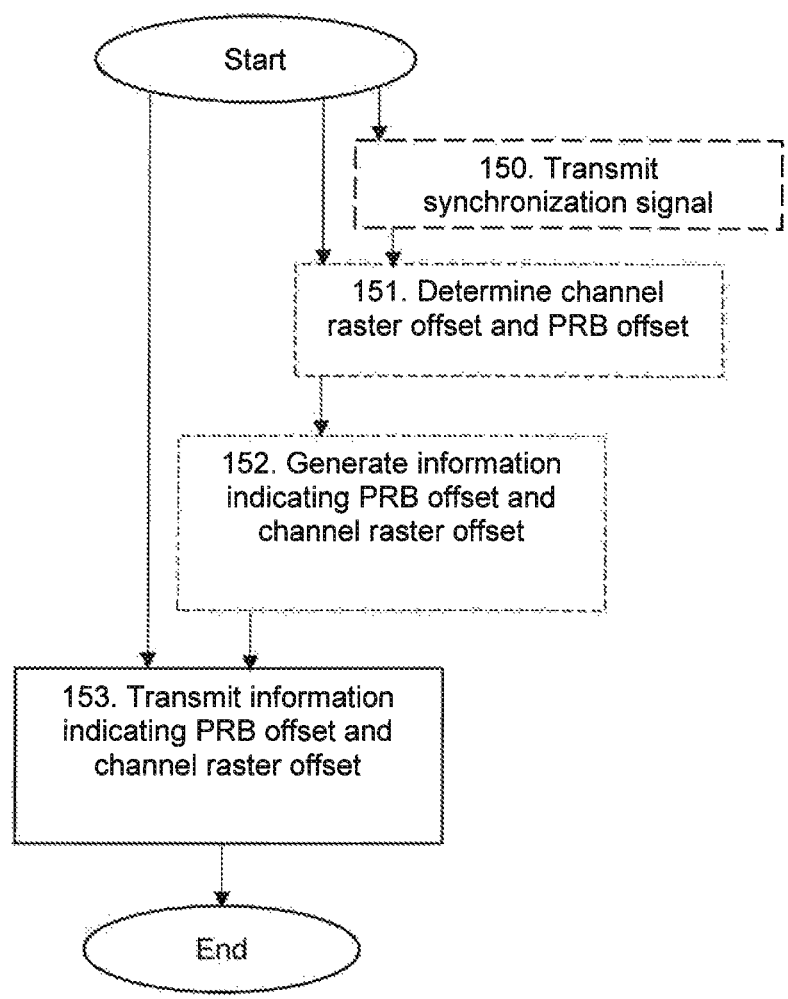
FIG. 1d is a schematic flowchart depicting a method performed by a network node according to embodiments herein.

The method actions performed by the network node 101 in the first wireless communication system that is deployed on the frequency resource 145 according to some embodiments will now be described with reference to a flowchart depicted in FIG. 1d. Actions performed in some, but not necessarily all, embodiments are marked with dashed boxes. The method may be for enabling, or enhancing the possibilities for, the wireless device to communicate with or in the first wireless communication system.

Action 150. The network node 101 may transmit the synchronization signal to be received by the wireless device 105 during the cell search process.

Action 151. The network node 101 may determine the PRB offset for the frequency resource on which the first wireless communication system is deployed and the corresponding channel raster offset. The network node 101 may determine whether there is an odd or even number of PRBs spanning a system bandwidth of the second wireless communication system.

Action 152. The network node 101 may further generate the information indicating the PRB offset and the corresponding channel raster offset.

Action 153. The network node 101 transmits the information indicating the PRB offset and the corresponding channel raster offset. The channel raster offset is the offset in frequency between a channel raster, used by the wireless device 105 in the cell search process, and the frequency resource 145. The PRB offset indicates the offset between the frequency resource 145 and the inner frequency resource 133 on which the second wireless communication system is deployed. In the frequency domain, the second wireless communication system is deployed on the at least one higher frequency resource 134 above the inner frequency resource and the at least one lower frequency resource 132 below the inner frequency resource. The network node 101 may transmit the information by transmitting a MIB of the first wireless communication system, which MIB may comprise five bits indicating the PRB offset and, at least implicitly, the corresponding channel raster offset. The MIB may further comprise a same-PCI indicator indicating same PCI of the first and second wireless communication systems. Alternatively, the information may be transmitted using RRC signaling to the wireless device 105. The transmitted information may comprise an index indicating the PRB offset and, at least implicitly, the corresponding channel raster offset.

In some embodiments the network node 101, transmits (action 153) information indicating the PRB offset wherein the information indicating the PRB offset is based on whether there is an odd or even number of PRBs spanning a system bandwidth of the second wireless communication system. The PRB offset indicates the offset between the frequency resource 145 on which the first wireless communication system is deployed and the inner frequency resource 133 on which the second wireless communication system is deployed. In the frequency domain, the second wireless communication system is deployed on the at least one higher frequency resource 134 above the inner frequency resource 133 and the at least one lower frequency resource 132 below the inner frequency resource 133. The PRB offset has a sign that is positive when the frequency resource 145 is a higher frequency resource than the inner frequency resource 133, and negative when the frequency resource 145 is a lower frequency resource than the inner frequency resource 133.

Figure 1E:
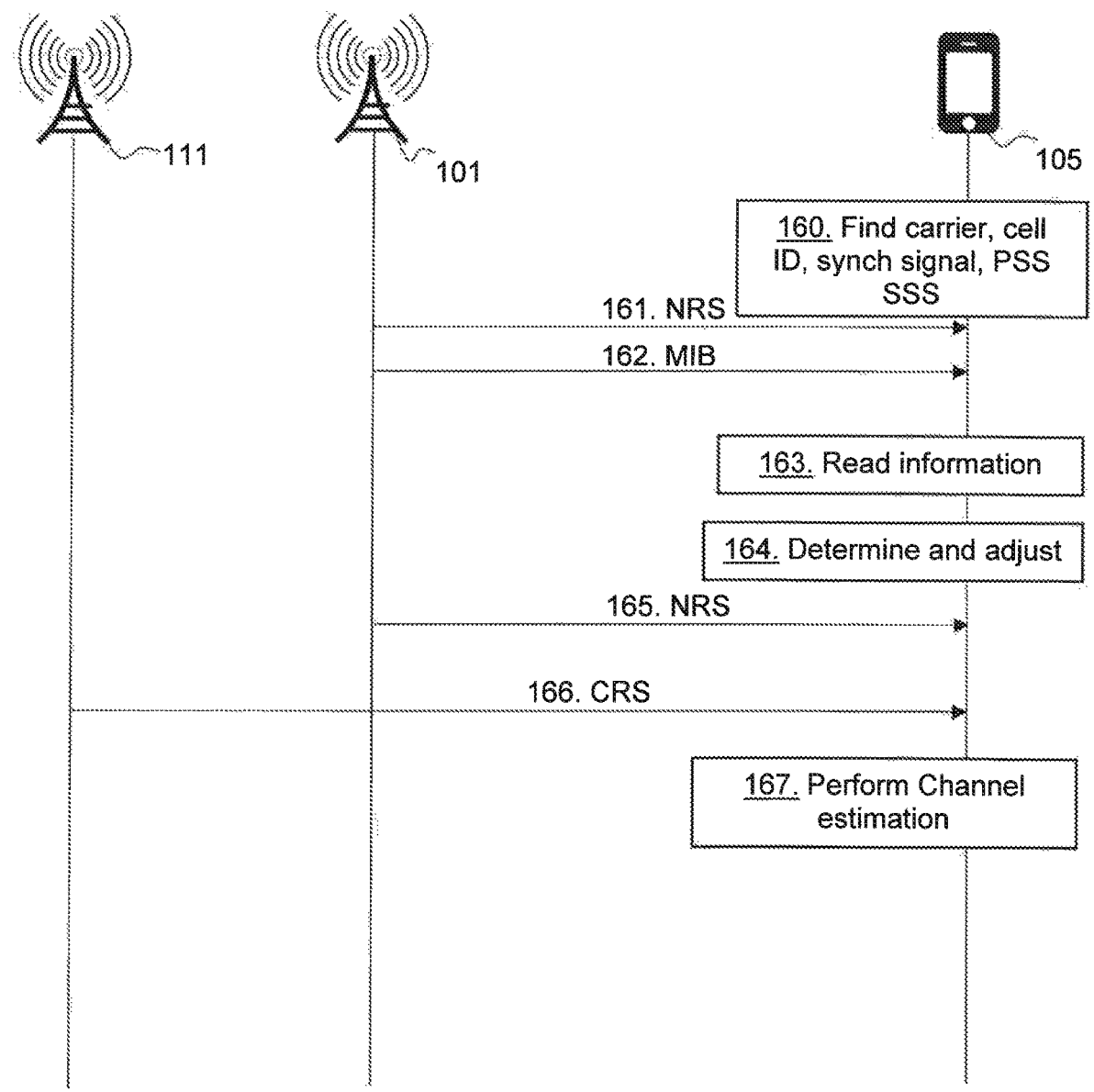
FIG. 1e is a combined flowchart and signaling scheme according to embodiments herein.

FIG. 1e is a combined flowchart and signaling scheme according to embodiments herein. The actions may be performed in any suitable order.

Action 160. The wireless device 105 may try to find a carrier of the second communication system in a step size of a channel raster e.g. in a step size of 100 kHz, by detecting/receiving the synchronization signal on the carrier, e.g. receiving the NB-IoT Primary Synchronization Sequence (NB-PSS) and/or the NB-IoT Secondary Synchronization Sequence (NB-SSS) and retrieving the cell identity (ID).

Action 161. The first network node 101 transmits reference signals such as Narrowband Reference signals (NRS) according to a predefined mapping in the frequency domain.

Action 162. The network node 101 may transmit the MIB over the first communication system.

Action 163. The wireless device 105 reads, using the received NRS known from the synchronization signal, the information indicating the PRB offset and the corresponding channel raster offset from the MIB on the found carrier. The MIB may comprise the PRB index and further the same-PCI indicator.

Action 164. The wireless device 105 determines, based on the information received in action 163, the adjustment in frequency applicable for the frequency resource 145 on which the first wireless communication system is deployed and adjusts accordingly i.e. tunes to the center frequency of the frequency resource 145 of the first wireless communication system.

Action 165. The first network node 101 transmits further NRSs.

Action 166. The second network node 111 transmits CRS according to a predefined mapping in the frequency domain.

Action 167. The wireless device 105 may then perform channel estimation based on the NRS and CRS. E.g. the wireless device 105 may read the information that is included in the MIB to obtain a CRS sequence. The MIB may further include the same-PCI indicator indicating that the same PCI is used. The PRB offset and the same-PCI indicator may be used to determine where CRS of the second communication system are located, which CRS may be used by the wireless device 105 for channel estimation of the channel set up to the first wireless communication system and/or demodulation of communications from the first wireless communication system.

Figure 2A:
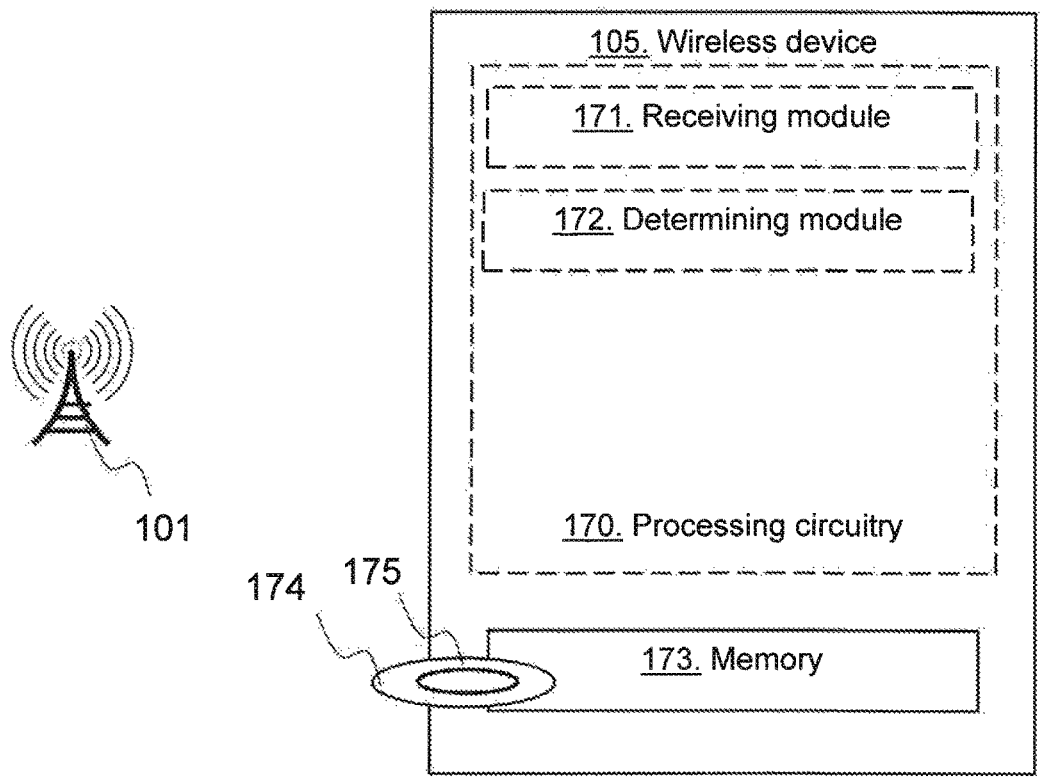
FIG. 2a is a block diagram depicting a wireless device according to embodiments herein.
Figure 2A:
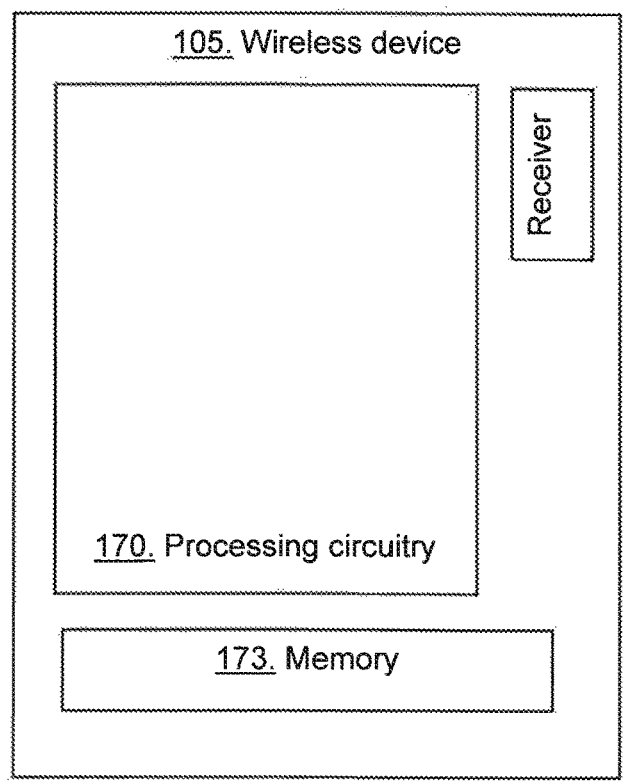

FIG. 2a is a block diagram depicting the wireless device 105 in the first wireless communication system that is deployed on the frequency resource 145.

The wireless device 105 may comprise processing circuitry 170, e.g. one or more processors, configured to perform the methods herein.

The wireless device 105 may comprise a receiving module 171, e.g. a receiver or a transceiver. The wireless device 105, the processing circuitry 170, and/or the receiver or the receiving module 171 is configured to receive information indicating the PRB offset and the corresponding channel raster offset. The channel raster offset is the offset in frequency between the channel raster, used by the wireless device 105 in the cell search process, and the frequency resource 145. The PRB offset indicates the offset between the frequency resource 145 and the inner frequency resource 133 on which the second wireless communication system is deployed. In the frequency domain, the second wireless communication system is deployed on the at least one higher frequency resource 134 above the inner frequency resource 133 and the at least one lower frequency resource 132 below the inner frequency resource 133.

The wireless device 105 may comprise a determining module 172. The wireless device 105, the processing circuitry 170, and/or the determining module 172 is configured to determine, based on the received information, the adjustment in frequency applicable for the frequency resource 145 on which the first wireless communication system is deployed.

The wireless device 105, the processing circuitry 170, and/or the receiver or the receiving module 171 may be configured to receive, during the cell search process using the channel raster, the synchronization signal of the first wireless communication system.

That the wireless device 105, the processing circuitry 170, and/or the receiver or the receiving module 171 is being configured to receive the information indicating the PRB offset and the corresponding channel raster offset may enable the wireless device 105 to determine, based on the PRB offset, CRS information of the second communication system and to use this information for channel estimation and/or for demodulation in the first wireless communication system.

The wireless device 105, the processing circuitry 170, and/or the receiver or the receiving module 171 may be configured to receive the information by being configured to receive a MIB of the first wireless communication system, which MIB comprises five bits indicating the PRB offset and the corresponding channel raster offset.

The information may comprise the index indicating the PRB offset and, at least implicitly, the corresponding channel raster offset.

The wireless device 105, the processing circuitry 170, and/or the receiver or the receiving module 171 may be configured to receive information indicating the PRB offset, wherein the information indicating the PRB offset is based on whether there is an odd or even number of PRBs spanning a system bandwidth of a second wireless communication system. The PRB offset indicates an offset between the frequency resource 145 on which the first wireless communication system is deployed and an inner frequency resource 133 on which the second wireless communication system is deployed. In the frequency domain, the second wireless communication system is deployed on at least one higher frequency resource 134 above the inner frequency resource 133 and at least one lower frequency resource 132 below the inner frequency resource 133. The PRB offset has a sign that is positive when the frequency resource 145 is a higher frequency resource than the inner frequency resource 133, and negative when the frequency resource 145 is a lower frequency resource than the inner frequency resource 133.

The wireless device 105, the processing circuitry 170, and/or the determining module 172 may be configured to determine, based on the received information, a channel raster offset corresponding to the indicated PRB offset, wherein the channel raster offset is an offset in frequency between a channel raster, which channel raster is used by the wireless device in a cell search process, and the frequency resource 145 on which the first wireless communication system is deployed.

The wireless device 105 further comprises a memory 173 comprising one or more memory units. The memory 173 comprises instructions executable by the processing circuitry 170 to perform the methods herein when being executed in the wireless device 105. The memory 173 is arranged to be used to store e.g. information, data such as indices, PRB indices, tables, channel raster grid, cell search configurations, PRB offsets, channel raster offsets, and application(s) to perform the methods described herein when being executed on e.g. a processor, etc.

The methods according to the embodiments described herein for the wireless device 105 may be respectively implemented by means of e.g. a computer program 174 or a computer program product, comprising instructions, i.e., software code portions, which, when executed on at least one processor, cause the at least one processor to carry out the actions described herein, as performed by the wireless device 105. The computer program 174 may be stored on a computer-readable storage medium 175, e.g. a disc or similar. The computer-readable storage medium 175, having stored thereon the computer program, may comprise the instructions which, when executed on at least one processor, e.g. downloaded and ran, cause the at least one processor to carry out the actions described herein, as performed by the wireless device 105. In some embodiments, the computer-readable storage medium may be a non-transitory computer-readable storage medium.

Figure 2B:
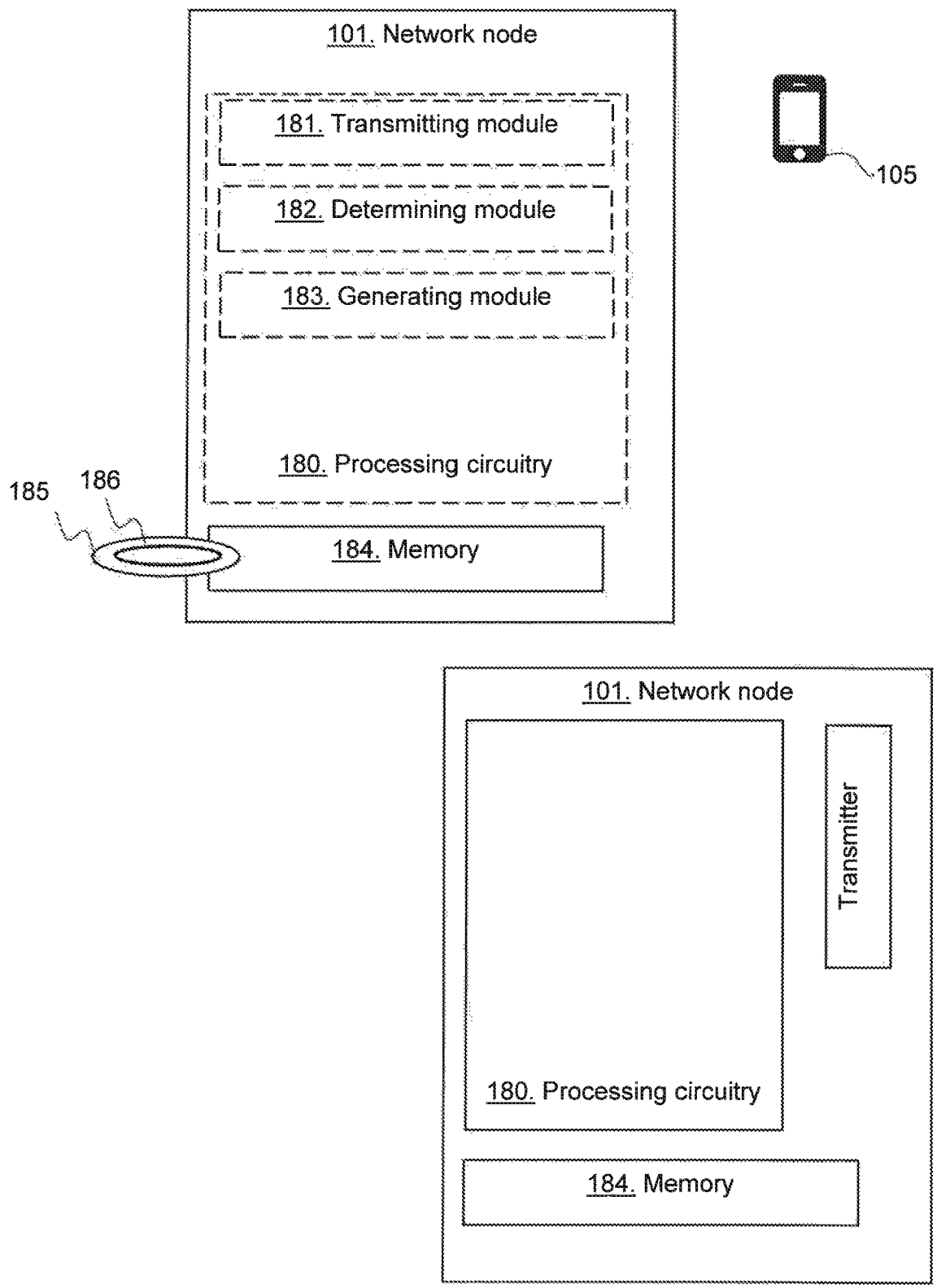
FIG. 2b is a block diagram depicting a network node according to embodiments herein.

FIG. 2b is a block diagram depicting the network node 101 in the first wireless communication system that is deployed on the frequency resource 145.

The network node 101 may comprise processing circuitry 180, e.g. one or more processors, configured to perform the methods herein.

The network node 101 may comprise a transmitting module 181, e.g. a transmitter or a transceiver. The network node 101, the processing circuitry 180, and/or the transmitter or the transmitting module 181 is configured to transmit the information indicating the PRB offset and the corresponding channel raster offset. The channel raster offset is the offset in frequency between the channel raster used by the wireless device 105 in the cell search process and the frequency resource 145. The PRB offset indicates the offset between the frequency resource 145 and the inner frequency resource 133 on which the second wireless communication system is deployed. In the frequency domain, the second wireless communication system is deployed on the at least one higher frequency resource 134 above the inner frequency resource 133 and the at least one lower frequency resource 132 below the inner frequency resource 133.

The network node 101, the processing circuitry 180, and/or the transmitter or the transmitting module 181 may be configured to transmit the synchronization signal to be received by the wireless device 105 during the cell search process.

The network node 101 may comprise a determining module 182. The wireless device 105, the processing circuitry 180, and/or the determining module 182 may be configured to determine the channel raster offset and the PRB offset for the frequency resource 145 on which the first wireless communication system is deployed.

The network node 101 may comprise a generating module 183. The wireless device 105, the processing circuitry 180, and/or the generating module 183 may be configured to generate the information indicating the determined PRB offset and the corresponding channel raster offset.

The network node 101, the processing circuitry 180, and/or the transmitter or the transmitting module 181 may be configured to transmit the MIB of the first wireless communication system, which MIB comprises five bits indicating the PRB offset and the corresponding channel raster offset. The MIB may further comprise the same-PCI indicator.

The transmitted information may comprise an index indicating the PRB offset and the corresponding channel raster offset.

The network node 101, the processing circuitry 180, and/or the transmitter or the transmitting module 181 may be configured to transmit the information indicating the PRB offset, wherein the information indicating the PRB offset is based on whether there is an odd or even number of PRBs spanning a system bandwidth of a second wireless communication system. The PRB offset indicates an offset between the frequency resource 145 on which the first wireless communication system is deployed and an inner frequency resource 133 on which the second wireless communication system is deployed. In the frequency domain, the second wireless communication system is deployed on at least one higher frequency resource 134 above the inner frequency resource 133 and at least one lower frequency resource 132 below the inner frequency resource 133. The PRB offset has a sign that is positive when the frequency resource 145 is a higher frequency resource than the inner frequency resource 133, and negative when the frequency resource 145 is a lower frequency resource than the inner frequency resource 133.

The network node 101 further comprises a memory 184 comprising one or more memory units. The memory 184 comprises instructions executable by the processing circuitry 180 to perform the methods herein when being executed in the network node 101. The memory 184 is arranged to be used to store e.g. information, data such as allocation of frequency resources, indices, PRB indices, tables, channel raster grid, cell search configurations, PRB offsets, channel raster offsets, and application(s) to perform the methods described herein when being executed on e.g. a processor, etc.

The methods according to the embodiments described herein for the network node 101 may be respectively implemented by means of e.g. a computer program 185 or a computer program product, comprising instructions, i.e., software code portions, which, when executed on at least one processor, cause the at least one processor to carry out the actions described herein, as performed by the network node 101. The computer program 185 may be stored on a computer-readable storage medium 186, e.g. a disc or similar. The computer-readable storage medium 186, having stored thereon the computer program, may comprise the instructions which, when executed on at least one processor, cause the at least one processor to carry out the actions described herein, as performed by the network node 101. In some embodiments, the computer-readable storage medium may be a non-transitory computer-readable storage medium.

Figure 3A:
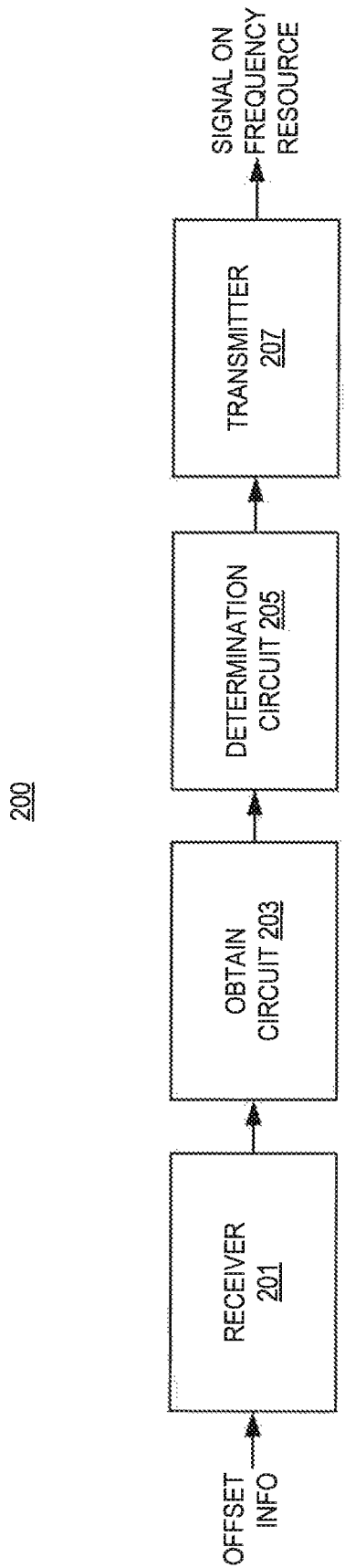
FIG. 3a illustrates an embodiment of a wireless device in accordance with various aspects as described herein.

FIG. 3a illustrates one embodiment of a wireless device 200 for deploying a frequency resource in a wireless communication system in accordance with various aspects as described herein. The illustrated wireless device 200 comprises a receiver 201, an obtaining circuit 203, a determination circuit 205, and a transmitter 207.

Figure 3B:
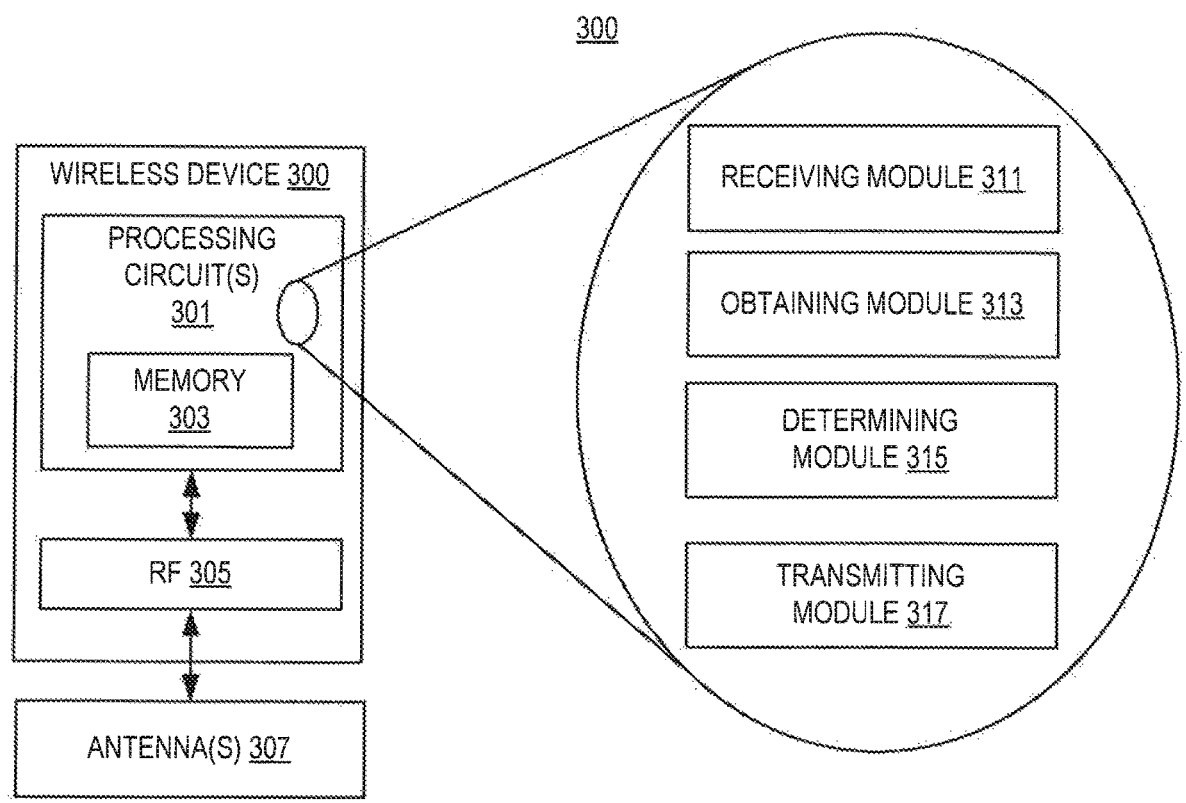
FIG. 3b illustrates another embodiment of a wireless device in accordance with various aspects as described herein.

FIG. 3b illustrates another embodiment of a wireless device 300 for deploying a frequency resource in a first wireless communication system in accordance with various aspects as described herein. The illustrated wireless device 300 comprises a processing circuit or circuits 301, a memory 303, a radio frequency (RF) interface 305, and one or more antennas 307. The processing circuit or circuits may comprise a receiving module 311, an obtaining module 313, a determining module 315 and/or a transmitting module 317.

Figure 4:
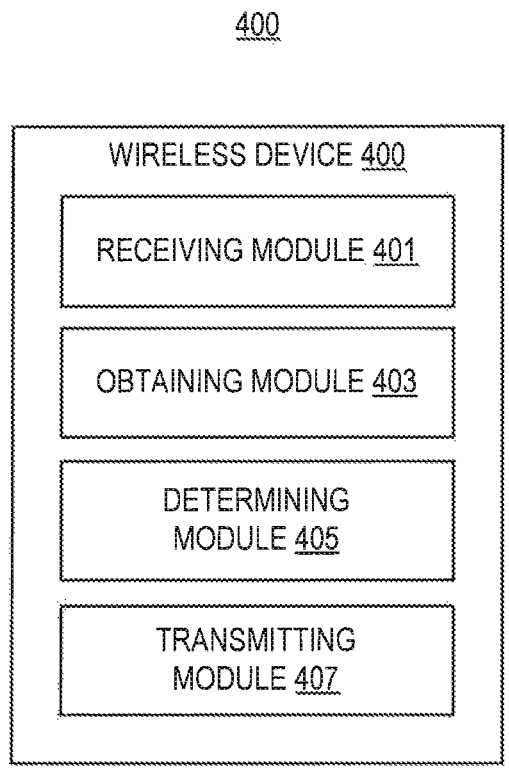
FIG. 4 illustrates another embodiment of a wireless device accordance with various aspects as described herein.

FIG. 4 illustrates another embodiment of a wireless device 400 for deploying a frequency resource in a wireless communication system in accordance with various aspects as described herein. The illustrated wireless device 400 may comprise a receiving module 401, an obtaining module 403, a determining module 405 and/or a transmitting module 407.

Figure 5:
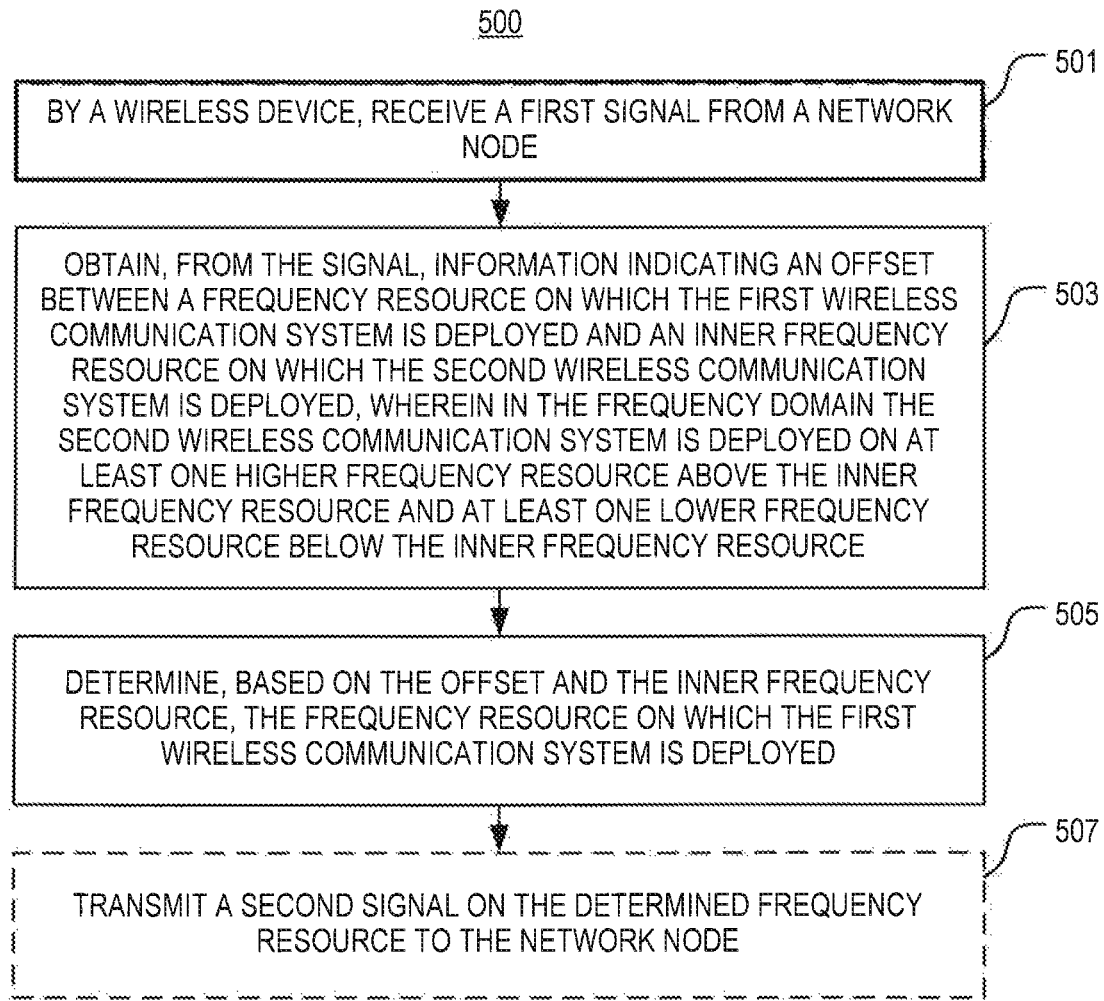
FIG. 5 illustrates an embodiment of a method performed by a wireless device in accordance with various aspects as described herein.

FIG. 5 illustrates one embodiment of a method 500 by a wireless device for deploying a frequency resource in a wireless communication system in accordance with various aspects as described herein.

Action 501. By the wireless device receive a first signal from a network node.

Action 503. The wireless device obtains, from the signal, information indicating the offset between the frequency resource on which the first wireless communication system is deployed and the inner frequency resource on which the second wireless communication system is deployed. In the frequency domain, the second wireless communication system is deployed on the at least one higher frequency resource above the inner frequency resource and the at least one lower frequency resource below the inner frequency resource.

Action 505. The wireless device determines, based on the offset and the inner frequency resource, the frequency resource on which the first wireless communication system is deployed.

Action 507. The wireless device may transmit a second signal on the determined frequency resource to the network node.

Figure 6:
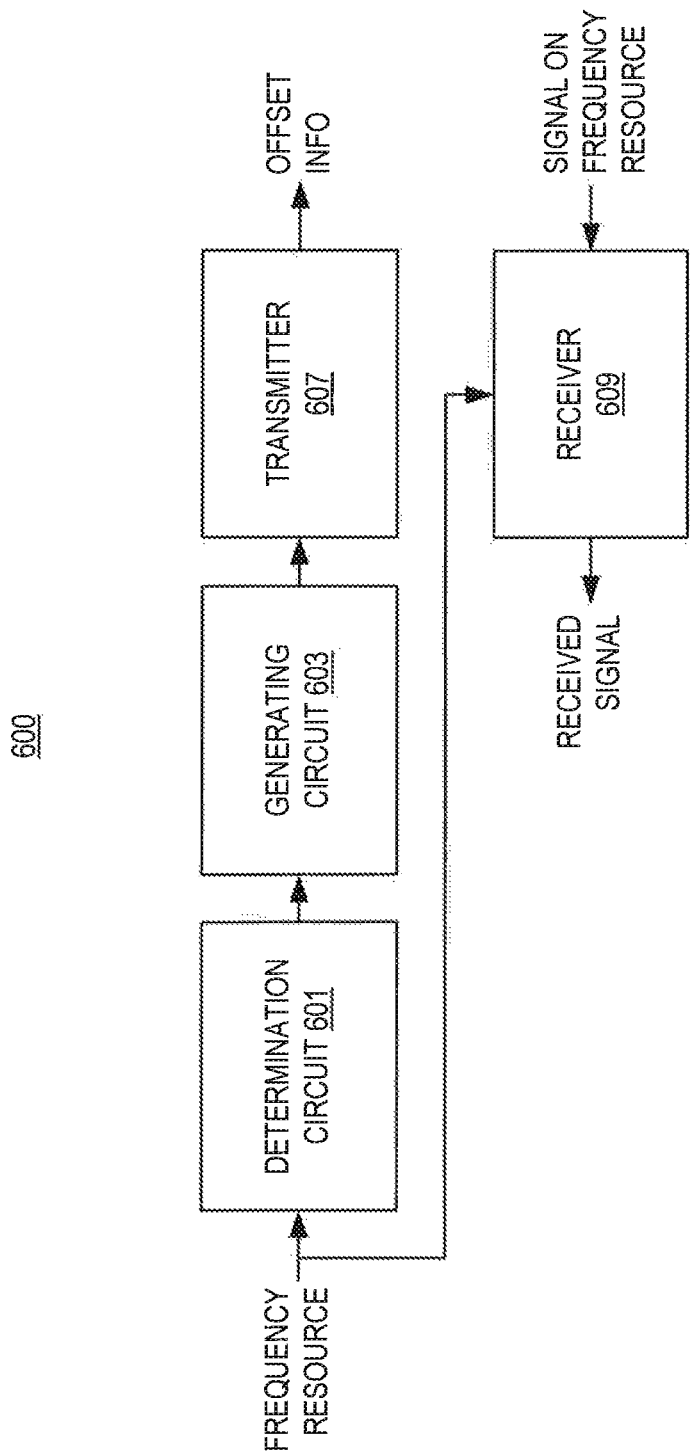
FIG. 6 illustrates an embodiment of a network node for in accordance with various aspects as described herein.

FIG. 6 illustrates one embodiment of a network node 600 for deploying a frequency resource in a first wireless communication system in accordance with various aspects as described herein. The illustrated network node 600 comprises a determination circuit 601, a generating circuit 603, a transmitter 607, and a receiver 609. The frequency resource deployed for the first wireless communication network that is offset to the inner frequency on which the second wireless communication network is deployed. An offset information is transmitted to the wireless device from the transmitter 607.

Figure 7:
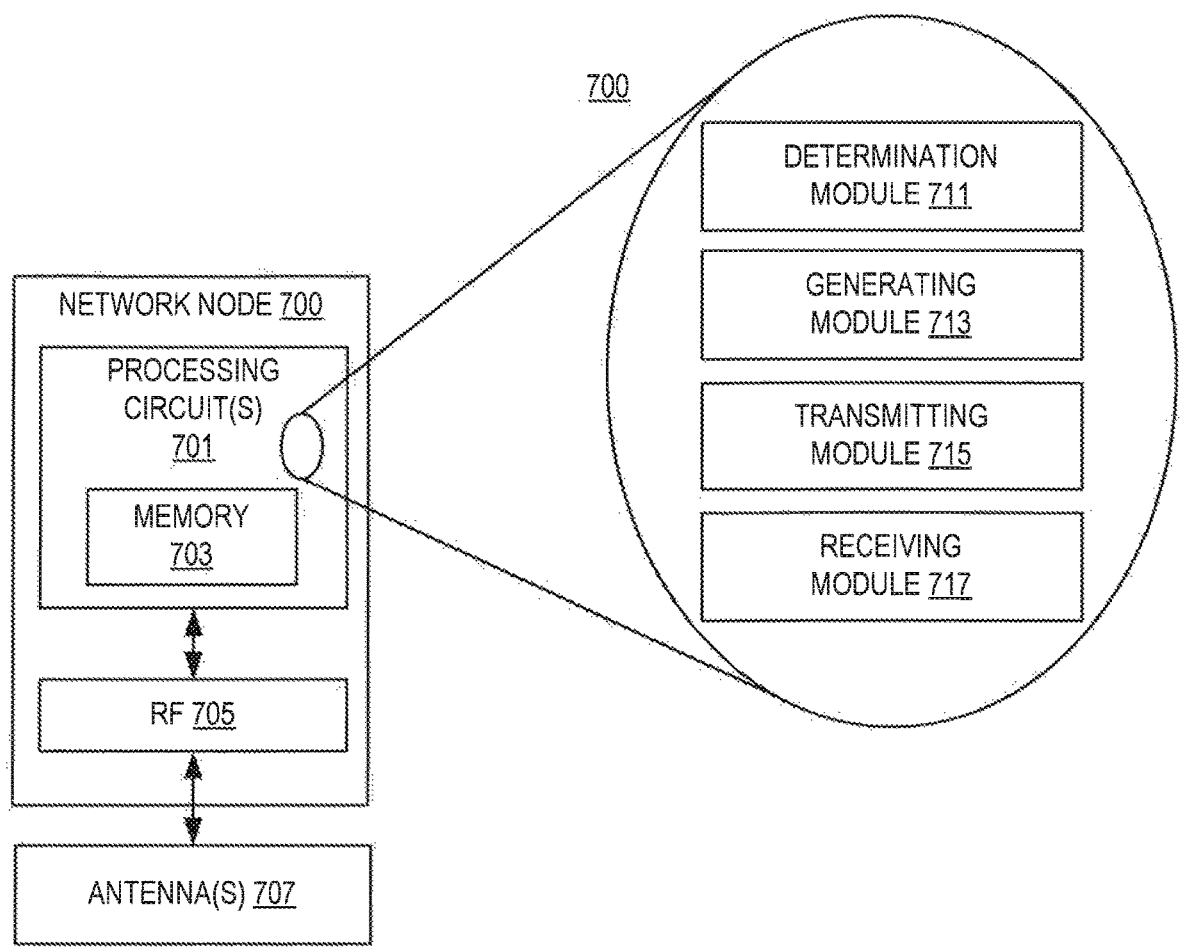
FIG. 7 illustrates another embodiment of a network node in accordance with various aspects as described herein.

FIG. 7 illustrates another embodiment of a network node 700 for deploying a frequency resource in a wireless communication system in accordance with various aspects as described herein. The illustrated network node 700 comprises a processing circuit or circuits 701, a memory 703, a radio frequency (RF) interface 705, and one or more antennas 707. The processing circuit or circuits 701 may comprise a determining module 711, a generating module 713, a transmitting module 715 and/or a receiving module 717.

Figure 8:
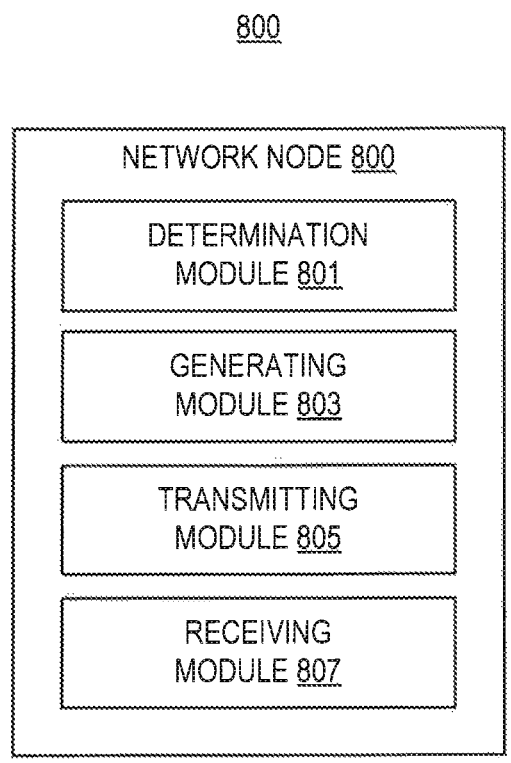
FIG. 8 illustrates another embodiment of a network node in accordance with various aspects as described herein.

FIG. 8 illustrates another embodiment of a network node 800 for deploying a frequency resource in a wireless communication system in accordance with various aspects as described herein. The illustrated network node 800 may comprise a determining module 801, a generating module 803, a transmitting module 805 and/or a receiving module 807.

Figure 9:
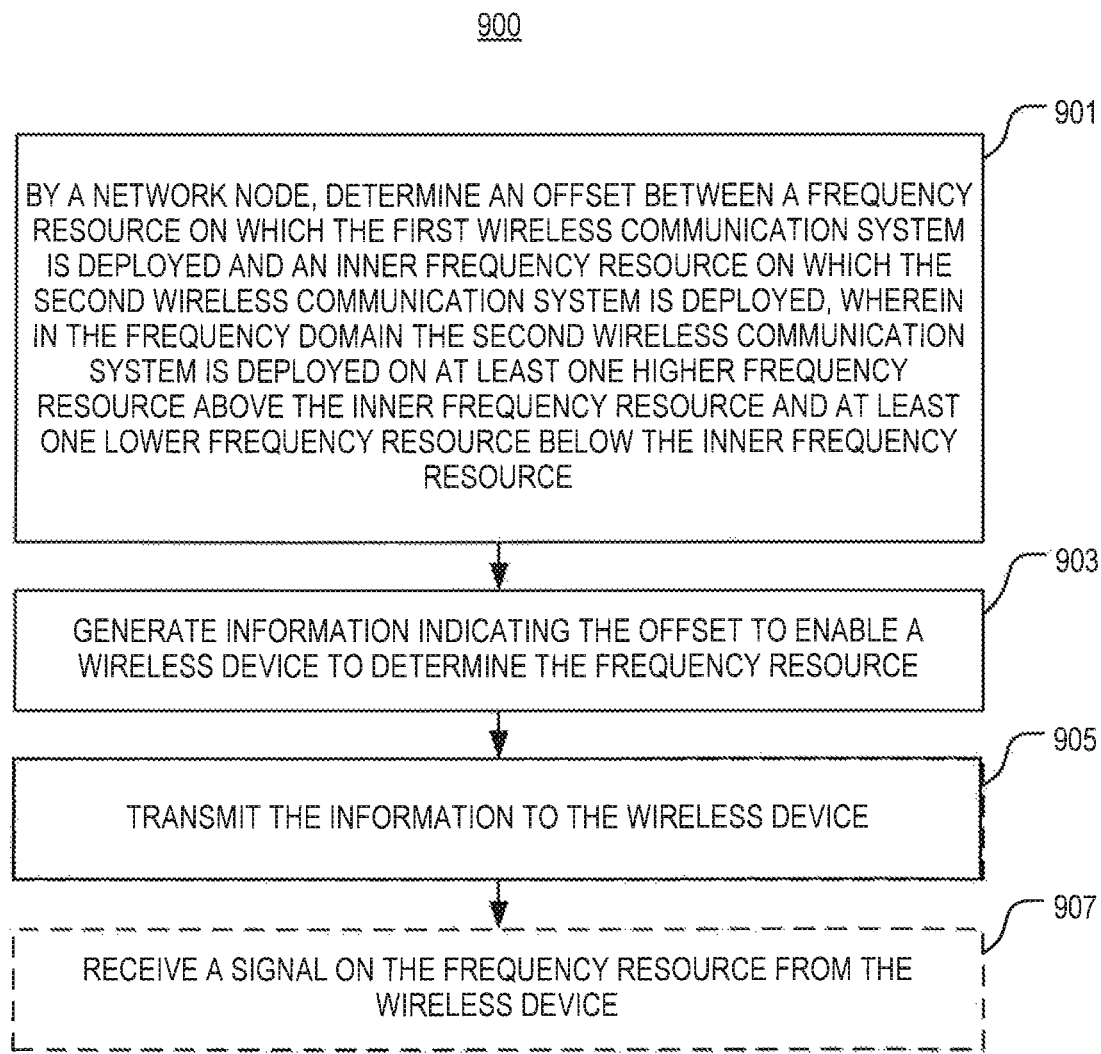
FIG. 9 illustrates an embodiment of a method performed by a network node in accordance with various aspects as described herein.

FIG. 9 illustrates one embodiment of a method by a network node for deploying a frequency resource in a wireless communication system in accordance with various aspects as described herein.

Action 901. The network node determines an offset between the frequency resource on which the first wireless communication system is deployed and the inner frequency resource on which the second wireless communication system is deployed. In the frequency domain, the second wireless communication system is deployed on the at least one higher frequency resource above the inner frequency resource and the at least one lower frequency resource below the inner frequency resource.

Action 903. The network node generates information indicating the offset to enable the wireless device to determine the frequency resource on which the first wireless communication system is deployed.

Action 905. The network node transmits the information to the wireless device.

Action 907. The network node may receive a signal on the frequency resource from the wireless device.

Of course, despite particular applicability to NB-IoT in some examples, it will be appreciated that the techniques may be applied to other wireless networks, including eMTC as well as to successors of the Evolved-Universal Terrestrial Radio Access Network (E-UTRAN9. Thus, references herein to signals using terminology from the 3GPP standards for LTE should be understood to apply more generally to signals having similar characteristics and/or purposes, in other networks.

A radio node herein is any type of node (e.g., a base station or wireless communication device) capable of communicating with another node over radio signals. A network node is any type of radio node within a wireless communication network, such as a base station, an access point, a wireless router, or the like The network node may further be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. A wireless device or wireless communication device is any type of radio node capable of communicating with a network node over radio signals. The wireless device may therefore refer to a machine-to-machine (M2M) device, a machine-type communications (MTC) device, a NB-IoT device, etc. The wireless device may also be a User Equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IoT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

Furthermore, in an NB-IoT context, it may be the case that, to support lower manufacturing costs for NB-IOT devices, the transmission bandwidth is reduced to one physical resource block (PRB) of size 180 KHz. Both frequency division duplexing (FDD) and Time Division Duplexing (TDD) are supported. For FDD (i.e. the transmitter and receiver operate at different carrier frequencies) only half-duplex mode needs to be supported in the wireless device. The lower complexity of the devices (e.g. only one transmission/receiver chain) means that a small number of repetitions might be needed also in normal coverage. Further, to alleviate wireless device complexity, the working assumption may be to have cross-subframe scheduling. That is, a transmission is first scheduled on Enhanced Physical DL Control Channel (E-PDCCH aka M-EPDCCH) and then the first transmission of the actual data on the Physical DL Shared Channel (PDSCH) is carried out after the final transmission of the M-EPDCCH.

Figure 10:
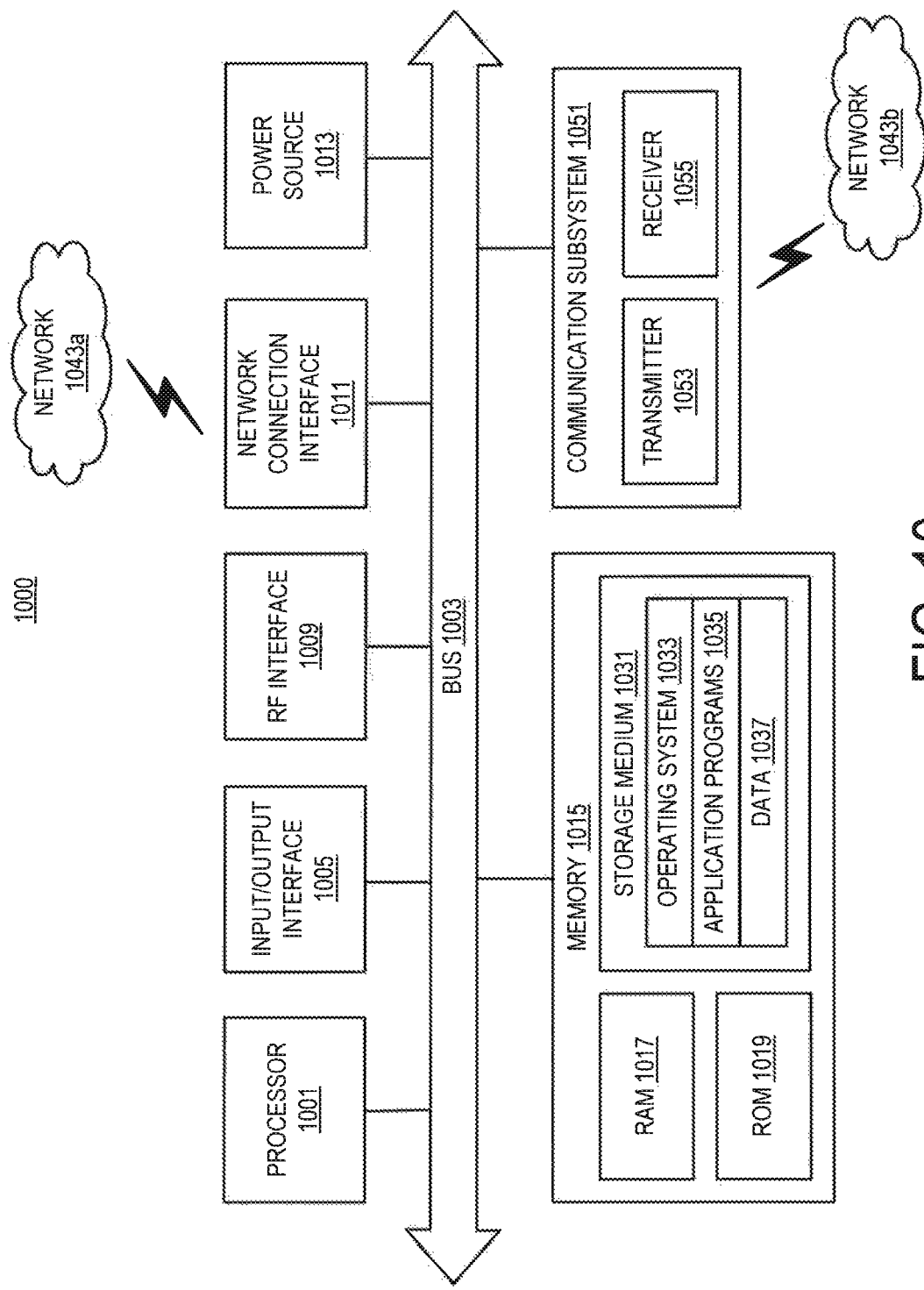
FIG. 10 illustrates another embodiment of a wireless device in accordance with various aspects as described herein.

FIG. 10 illustrates another embodiment of a wireless device 1000, in accordance with various aspects as described herein. In some instances, the wireless device 1000 may be referred as a network node, a base station (BS), an access point (AP), a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 1000 may be a set of hardware components. In FIG. 10, the wireless device 1000 may be configured to include a processor 1001 that is operatively coupled to an input/output interface 1005, a radio frequency (RF) interface 1009, a network connection interface 1011, a memory 1015 including a random access memory (RAM) 1017, a read only memory (ROM) 1019, a storage medium 1031 or the like, a communication subsystem 1051, a power source 1013, another component, or any combination thereof. The storage medium 1031 may include an operating system 1033, an application program 1035, data 1037, or the like. Specific devices may utilize all of the components shown in FIG. 10, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 10, the processor 1001 may be configured to process computer instructions and data. The processor 1001 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 1001 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1005 may be configured to provide a communication interface to an input device, output device, or input and output device. The wireless device 1000 may be configured to use an output device via the input/output interface 1005. A person of ordinary skill will recognize that an output device may use the same type of interface port as an input device. For example, a USB port may be used to provide input to and output from the wireless device 1000. The output device may be a speaker, a sound card, a video card, a display, a monitor, a printer, an actuator, an emitter, a smartcard, another output device, or any combination thereof. The wireless device 1000 may be configured to use an input device via the input/output interface 1005 to allow a user to capture information into the wireless device 1000. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, the RF interface 1009 may be configured to provide a communication interface to RF components such as a transmitter, a receiver, and an antenna. The network connection interface 1011 may be configured to provide a communication interface to a network 1043a. The network 1043a may encompass wired and wireless communication networks such as a local-area network (LAN), a wide-area network (WAN), a computer network, a wireless network, a telecommunications network, another like network or any combination thereof. For example, the network 1043a may be a Wi-Fi network. The network connection interface 1011 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1011 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 1017 may be configured to interface via the bus 1003 to the processor 1001 to provide storage or caching of data or computer instructions during the execution of software programs such as the operating system, application programs, and device drivers. In one example, the wireless device 1000 may include at least one hundred and twenty-eight megabytes (128 Mbytes) of RAM. The ROM 1019 may be configured to provide computer instructions or data to the processor 1001. For example, the ROM 1019 may be configured to be invariant low-level system code or data for basic system functions such as basic input and output (I/O), startup, or reception of keystrokes from a keyboard that are stored in a non-volatile memory. The storage medium 1031 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1031 may be configured to include an operating system 1033, an application program 1035 such as a web browser application, a widget or gadget engine or another application, and a data file 1037.

In FIG. 10, the processor 1001 may be configured to communicate with a network 1043b using the communication subsystem 1051. The network 1043a and the network 1043b may be the same network or networks or different network or networks. The communication subsystem 1051 may be configured to include one or more transceivers used to communicate with the network 1043b. The one or more transceivers may be used to communicate with one or more remote transceivers of another wireless device such as a base station of a radio access network (RAN) according to one or more communication protocols known in the art or that may be developed, such as IEEE 1002.xx, code division multiple access (CDMA), wideband code division multiple access (WCDMA), GSM, LTE, Universal Terrestrial Radio Access Network (UTRAN), WiMax, or the like.

In another example, the communication subsystem 1051 may be configured to include one or more transceivers used to communicate with one or more remote transceivers of another wireless device such as user equipment according to one or more communication protocols known in the art or that may be developed, such as IEEE 1002.xx, CDMA, WCDMA, GSM, LTE, UTRAN, WiMax, or the like. Each transceiver may include a transmitter 1053 or a receiver 1055 to implement transmitter or receiver functionality, respectively, appropriate to the RAN links (e.g., frequency allocations and the like). Further, the transmitter 1053 and the receiver 1055 of each transceiver may share circuit components, software or firmware, or alternatively may be implemented separately.

In the current embodiment, the communication functions of the communication subsystem 1051 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1051 may include cellular communication, Wi-Fi communication, Bluetooth communication, and GPS communication. The network 1043b may encompass wired and wireless communication networks such as a local-area network (LAN), a wide-area network (WAN), a computer network, a wireless network, a telecommunications network, another like network or any combination thereof. For example, the network 1043b may be a cellular network, a Wi-Fi network, and a near-field network. The power source 1013 may be configured to provide an alternating current (AC) or direct current (DC) power to components of the wireless device 1000.

In FIG. 10, the storage medium 1031 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1031 may allow the wireless device 1000 to access computer-executable instructions, application programs or the like, stored on transitory or non-transitory memory media, to off-load data, or to upload data. An article of manufacture, such as one utilizing a communication system may be tangibly embodied in storage medium 1031, which may comprise a computer-readable medium.

The functionality of the methods described herein may be implemented in one of the components of the wireless device 1000 or partitioned across multiple components of the wireless device 1000. Further, the functionality of the methods described herein may be implemented in any combination of hardware, software or firmware. In one example, the communication subsystem 1051 may be configured to include any of the components described herein. Further, the processor 1001 may be configured to communicate with any of such components over the bus 1003. In another example, any of such components may be represented by program instructions stored in memory that when executed by the processor 1001 performs the corresponding functions described herein. In another example, the functionality of any of such components may be partitioned between the processor 1001 and the communication subsystem 1051. In another example, the non-computative-intensive functions of any of such components may be implemented in software or firmware and the computative-intensive functions may be implemented in hardware.

Figure 11:
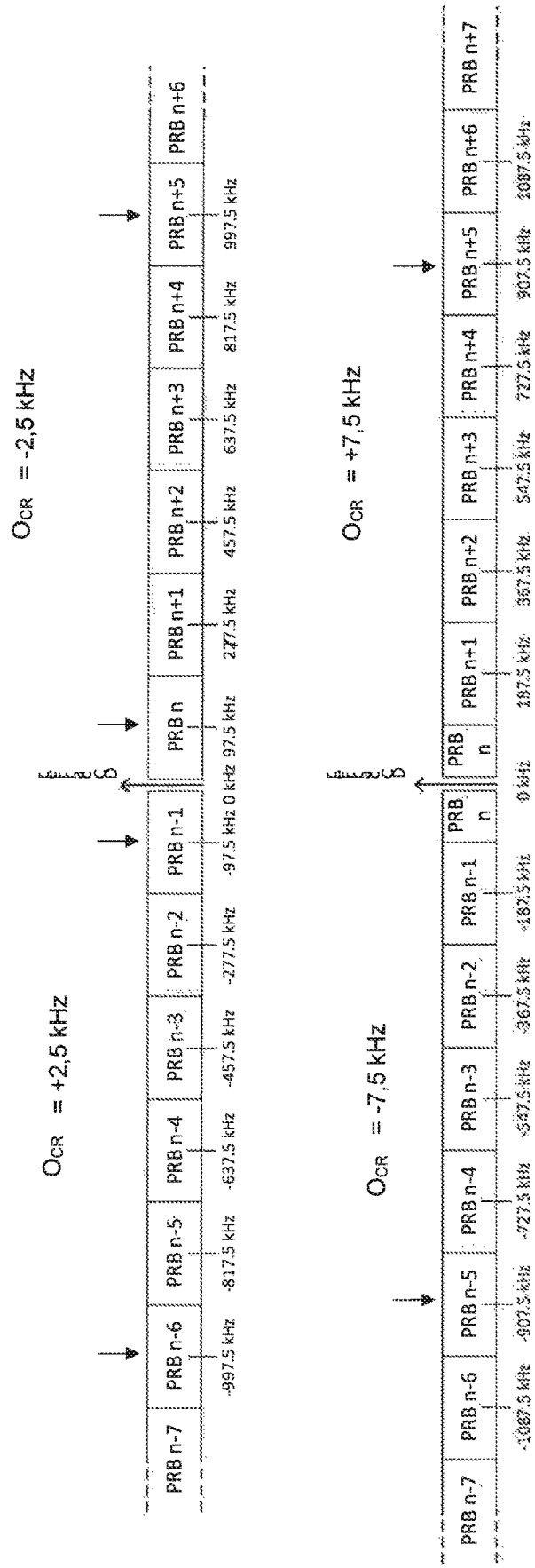
FIG. 11 illustrates embodiments of center frequency offsets of frequency resources for an even and odd number of frequency resources in a system bandwidth of a second wireless communication system in accordance with various aspects as described herein.

FIG. 11 illustrates embodiments of center frequency offsets of frequency resources for an even and odd number of frequency resources in a system bandwidth of a wireless communication system in accordance with various aspects as described herein. The channel raster offsets $O_{CR}$ are for different PRBs are disclosed. For the case of a system bandwidth of an even number of PRBs, for PRB n and PRB n+5 the channel raster offset is −2.5 kHz (i.e. for the wireless device to tune to the PRB from the channel raster grid). For PRB n−1 and PRB n−6 the channel raster offset is +2.5 kHz (i.e. for the wireless device to tune to the PRB from the channel raster grid). For the case of a system bandwidth of an uneven number of PRBs, for PRB n+5 the channel raster offset is +7.5 kHz (i.e. for the wireless device to tune to the PRB from the channel raster grid). For PRB n−5 the channel raster offset is −7.5 kHz (i.e. for the wireless device to tune to the PRB from the channel raster grid). As stated in the further embodiments explained below, if a 100 kHz raster is used, not all PRBs can be used for NB-IoT in-band deployment. For the guard-band operation, though the granularity does not need to be 1 PRB, in order to maintain orthogonality to the legacy LTE system and limited to the offset to ±2.5 kHz or ±7.5 kHz from 100 kHz raster grid, only some positions in the LTE guard-band can be used for the NB-IoT downlink carriers. ±2.5 kHz and ±7.5 kHz offset from the 100 kHz grid can be accommodated by the cell search process.

Cellular communication systems are currently being developed and improved for machine type communication (MTC), communication characterized by lower demands on data rates than for example mobile broadband, but with higher requirements on e.g. low cost device design, better coverage, and ability to operate for years on batteries without charging or replacing the batteries. Currently, 3GPP is standardizing a feature called Narrowband Internet of Things (NB-IoT) for satisfying all the requirements put forward by MTC type applications, while maintaining backward compatibility with the current LTE radio access technology. At 3GPP RAN #70 meeting, a new work item named Narrowband IoT (NB-IoT) was approved, see. The objective is to specify a radio access for cellular internet of things that addresses improved indoor coverage, support for massive number of low throughput devices, low delay sensitivity, ultra-low device cost, low device power consumption and (optimized) network architecture.

For NB-IoT, three different operation modes are defined, i.e., stand-alone, guard-band, and in-band. In stand-alone mode, the NB-IoT system is operated in dedicated frequency bands. For in-band operation, the NB-IoT system can be placed inside the frequency bands used by the current LTE system, while in the guard-band mode, the NB-IoT system can be placed in the guard band used by the current LTE system. The NB-IoT has a system bandwidth of 180 kHz.

The channel raster of the downlink of NB-IoT systems is on a frequency grid of 100 kHz. That is the NB-IoT devices try to find the NB-IoT carriers in a step size of 100 kHz. For the standalone deployment, this is fine. But for the in-band and guard-band operation, as observed in [2], due to the presence of the DC-carrier and the fact the center of the PRB is in between two sub-carriers, there is no PRB that falls directly on the cell search grid used in LTE in-band operation. The frequency offset to the 100 kHz grid is a minimum of ±2.5 kHz and ±7.5 kHz for even and odd number of PRBs in the LTE system bandwidth, respectively. This is shown in FIG. 11, and detailed description of this problem is given in [2] and [3]. The ±2.5 kHz or ±7.5 kHz can be handled by the device during the cell search process and then compensated [4] [5]. However, these offsets constrain the positions where NB-IoT carriers can be deployed for the in-band and guard-band operations.

For the guard-band operation, as showed in [2] that for an LTE system with 10 or 20 MHz system bandwidth, it is possible to find NB-IoT downlink carrier frequency that is 2.5 kHz off the 100 kHz frequency raster. For other LTE system bandwidth, the offset to the 100 kHz raster is 52.5 kHz. Therefore, in order to get within the same ±7.5 kHz to the 100 kHz grid, 3 guard subcarriers are needed. One guard carrier is 15 kHz width and placed in the same FFT grid at the legacy LTE system that gives orthogonality to the legacy LTE PRB. However, there are no other solutions to put the NB-IoT carriers on the exact 100 kHz raster grids on the LTE guard-band without losing orthogonality to the legacy LTE system.

For the in-band operation, the existing LTE CRSs can be used by the NB-IoT devices to improve the channel estimation. As it is agreed that the information to obtain CRS sequence is included in MIB, the MIB needs to include the same-PCI indicator and the PRB index [1].

The existing solution is either to transmit the NB-IoT carrier at a lower power or use stringent channel filter to ensure the LTE spectrum mask is not violated.

It is herein disclosed a novel way to index the PRB for NB-IoT in-band operation. This indexing can be used both for the anchor PRB signaled in the MIB, or for indexing the non-anchor PRB for multi-PRB operations of NB-IoT systems.

The proposed solution can index the PRB without signaling the LTE system bandwidth. Therefore, it can be applied for all cases, and be forward compatible if new LTE system bandwidth is defined in the future. Further, this proposed solution provides more flexibility of NB-IoT guard-band deployment without impacting the legacy LTE system.

FIG. 11 illustrates the center frequency offsets of LTE PRBs from even and odd system bandwidths. The DC carrier is placed in between of two PRBs (even number of PRBs) or in the middle of the middle PRB (odd number cases). As discussed in [2] [3], if a 100 kHz raster is used, not all PRBs can be used for NB-IoT in-band deployment. For the guard-band operation, though the granularity does not need to be 1 PRBs, in order to maintain orthogonality to the legacy LTE system and limited the offset to ±2.5 kHz or ±7.5 kHz from 100 kHz raster grid, only several positions in the LTE guard-band can be used for the NB-IoT downlink carriers [2]. In the evaluations in [4] [5], ±2.5 kHz and ±7.5 kHz offset from the 100 kHz grid can be accommodated by the cell search process.

For the in-band operation, the existing LTE CRSs can be used by the NB-IoT devices to improve the channel estimation. This also applies for the cases of multi-PRB operation of NB-IoT systems.

In order to obtain the exact LTE CRS information, PCID and PRB index may be needed. In the current system, since the PRB index is defined from low to high frequency, we signal the system bandwidth together with the PRB index in order to obtain the exact LTE CRS information. It is herein proposed a new way to signal the PRB index. The new method does not need to use the LTE system bandwidth to derive the LTE CRS information.

The LTE CRS positions in frequency domain can be derived from the PCID, and it is agreed in RAN1 NB-IoT Ad Hoc that "Note that the PCID from NB-SSS and the LTE PCID indicate the same LTE CRS position" [1]. Therefore, in order to obtain the exact LTE CRS information, the PRB position of the NB-IoT system needs to be indicated.

Regarding the multi-PRB operation in NB-IoT, if the anchor carrier is in the guard-band and the non-anchor carrier(s) are in-band, either the PCID can be chosen the same as what has been stated above, i.e., "Note that the PCID from NB-SSS and the LTE PCID indicate the same LTE CRS position" [1], to facilitate the LTE CRS derivation, or the PCID of the LTE system can be sent to NB-IoT devices via high layer signaling. The PRB indexing methods described in this disclosure can then be applied to indicate the position of the non-anchor PRBs.

Notice, the LTE CRS is generated in the manner as follows [7].

"The reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is the slot number within a radio frame and l is the OFDM symbol number within the slot. The pseudo-random sequence $c(i)$ is defined in clause 7.2. The pseudo-random sequence generator shall be initialized with $c_{init}=2^{10} \cdot (7 \cdot (n_s'+1)+l+1) \cdot (2 \cdot N_{ID}^{cell}+1)+2 \cdot N_{ID}^{cell}+N_{CP}$ at the start of each
OFDM symbol where $$n_s' = \begin{cases} 10\lfloor n_s/10 \rfloor + n_s \bmod 2 & \text{for frame structure type 3 when the CRS is part of a DRS} \\ n_s & \text{otherwise} \end{cases}$$

$$N_{CP} = \begin{cases} 1 & \text{for normal } CP \\ 0 & \text{for extended } CP \end{cases}$$

The reference signal sequence $r_{l,n_s}(m)$ shall be mapped to complex-valued modulation symbols $a_{k,l}^{(p)}$ used as reference symbols for antenna port p in slot $n_s$ according to $$a_{k,l}^{(p)} = r_{l,n_s}(m')$$

where $$k = 6m + (v + v_{shift}) \bmod 6$$

$$l = \begin{cases} 0, N_{sym}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

The variables $v$ and $v_{shift}$ define the position in the frequency domain for the different reference signals where $v$ is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

The cell-specific frequency shift is given by $v_{shift} = N_{ID}^{cell} \bmod 6$."

From the ways that the LTE CRSs are generated, we can use a new way to index the PRB which gives the same m', which is used to determine the LTE CRS information. To be more specific, for all the systems, as long as the offset from the middle PRB is known, the LTE CRS can be determined. Therefore, it is only necessary to signal the offset between the NB-IoT PRB to the offset of the LTE middle PRB.

Define the new PRB index numbering that starts from the middle as $$n_{PRB}' = n_{PRB} - (N_{RB}^{DL} - N_{RB}^{DL} \bmod 2)/2,$$

where $n_{PRB}$ is the original PRB index, and $n_{PRB}'$ is the new indexing being signaled, i.e. an example of the information indicating the PRB offset and the corresponding channel raster offset being signaled to the wireless device 105. Notice that the sign of $n_{PRB}$ is related to the sign of the channel raster offset. Therefore, the sign of the channel raster offset can be implicitly derived from $n_{PRB}'$.

Then m' is still calculated as $m' = N_{RB}^{maxDL} - N_{RB}^{DL}$, but with m being substituted by $n = 2 \cdot n_{PRB}' + N_{RB}^{DL} - N_{RB}^{DL} \bmod 2 + \tilde{m}$. Here $\tilde{m} = 0, 1$ for all the cases. As we can see from the calculation, $N_{RB}^{DL}$ is not needed in calculating m', and therefore the LTE system bandwidth does not need to be signaled. Moreover, since the odd and even number of PRBs is related to the absolute value of the channel raster offset, no additional signaling is needed. Another advantage of using this method is forward compatibility, if new LTE system bandwidth is defined in the further.

Please there are several ways to express n. The one we choose is one of the possibilities. As long as the final value of m' is the same, the LTE CRS can be successfully derived.

Please notice that in practice there are several ways to signal or derive the value of $n_{PRB}'$. One straight forward way is to directly signal the value of $n_{PRB}'$. This can be used for the multi-PRB operations. Another way is to indirectly signal $n_{PRB}'$. For example, we can scale $n_{PRE}'$ with a given step size. If every 5 PRBs are used, then $n_{PRE}'$ can be . . . −2, −1, 0 1, 2, . . . , and then we multiply it with the step size of 5 that gives, . . . −10, −5, 0, 5, 10 . . . as the actual indexing value. We will not describe all the possible ways to signal $n_{PRE}'$.

An example is given in the following paragraph to facilitate the understanding of the proposed indexing method. In this example, we use 10 MHz LTE system as an example to illustrate the proposed indexing method. The legacy LTE PRB indexing is from 0 to 49, and the indexing is from low frequency to high frequency. We choose PRB 35, which is one of the possible anchor positions of deploying NB-IoT carrier [3].

For PRB 35, following [7], we have $$m = 2 \cdot 35 + [0,1] = 70, 71.$$

Then we have $$m' = m + N_{RB}^{maxDL} - N_{RB}^{DL} = [70,71] + 110 - 50 = 130, 131.$$

The new indexing maps PRB 35 to the following offset from the LTE middle PRB as $$n_{PRB}' = n_{PRB} - (N_{RB}^{DL} - N_{RB}^{DL} \bmod 2)/2 = 35 - (50-50 \bmod 2)/2 = 10$$

Therefore, $$m' = n + N_{RB}^{max,DL} - N_{RB}^{DL} = 2 \cdot n_{PRB}' + N_{RB}^{DL} - N_{RB}^{DL} \bmod 2 + \tilde{m} + N_{RB}^{max,DL} - N_{RB}^{DL}$$

$$= 2 \cdot 10 + N_{RB}^{DL} - 50 \bmod 2 + [0,1] + 110 - N_{RB}^{DL} = 130, 131.$$

As we can see, with only indicating the offset, i.e., 10 PRBs from the middle, the same m' can be obtained without knowing the system bandwidth $N_{RB}^{DL}$.

At RAN #69, a new work item named Narrowband IoT (NB-IoT) was approved, see [6]. The objective is to specify a radio access for cellular internet of things that addresses improved indoor coverage, support for massive number of low throughput devices, low delay sensitivity, ultra-low device cost, low device power consumption and (optimized) network architecture.

NB-IOT should support 3 different modes of operation:
1. "Stand-alone operation" utilizing for example the spectrum currently being used by GERAN systems as a replacement of one or more GSM carriers
2. "Guard band operation" utilizing the unused resource blocks within a LTE carrier's guard-band
3. "In-band operation" utilizing resource blocks within a normal LTE carrier In RAN1#84 meeting, the following items about NPBCH and NB-MIB are agreed."
The 4 most significant bits of NB-IoT SFN are indicated in NB-MIB
4 bits are used to indicate NB-SIB1 scheduling information in NB-MIB
Rate matching, scrambling and mapping for Normal Cyclic Prefix (CP)
In FDD mode, after CRC attachment and channel coding, the NB-MIB is rate matched to E=1,600 bits denoted by e0, e1, . . . , eE-1 according to Section 5.3.1.3 in TS 36.212
The rate matched bits are scrambled with a sequence of length 1,600
The scrambling sequence for the NB-PBCH is given in 7.2 of TS 36.211 and is initialized with the NB-IoT Physical Cell Identifier (PCI) in each radio frame fulfilling nf mod 64=0 where nf is the System Frame Number (SFN)
The modulated bits are mapped to resource elements in a frequency first, time second fashion Within one NB-MIB TTI, the i-th block of 80 ms duration, i=0, 1, . . . , 7, is used to transmit bits e200*i+j, j=0, 1, . . . , 199, i.e., identical symbols are transmitted in each subframe #0 within the i-th block The number of NB-RS ports (1 or 2) is indicated by NB-PBCH CRC masking (all 0's for 1 port, and all 1's for 2 ports, as in the current spec for LTE CRS)

For rate matching purpose for NB-PBCH, the number of NB-RS ports is based on 2

The number of CRS ports is indicated by NB-MIB.

The deployment mode is indicated by NB-MIB

Note: it doesn't imply that it has to be a separate information field

Raster offset is indicated in NB-MIB

Working assumption:

Information to obtain CRS sequence (only needed if same-PCI indicator is set to true), and a same-PCI indicator (to indicate whether or not LTE PCI and NB-IoT PCI are the same) are indicated in NB-MIB Note that this working assumption is related to the working assumption regarding the potential usage of LTE CRS for demodulation FFS whether same-PCI indicator and PRB index are always present, or only in in-band case The differentiation of FDD vs. TDD is NOT indicated in Rel-13

Note: it is assumed that there is at least one reserved bit in NB-MIB

NB-MIB indicates the TBS of NB-SIB1, where the number of different TB sizes for NB-SIB1 transmission is 4.

Herein we discuss some remaining issues of NB-MIB and NPBCH design.

In NB-IoT, the essential system information, e.g., system frame number (SFN), for initial access to a cell is carried on NPBCH. It is beneficial to use the same NPBCH design for all three deployment modes, i.e., standalone, guard-band and in-band. In R1-160918, it is proposed that different version of MIB contents should be used for different operation modes, since some of fields in the MIB are not needed for some operations modes. Based on the understanding of the sourcing company, there are some similar properties experienced by in-band and guard-band operations, e.g., channel raster offset. Therefore, it is not necessary to define three different versions of MIB contents, but to use two versions of MIB contents, one for in-band and guard-band operations, and one for stand-alone. And the size of the MIB should be the same for all cases.

Observation 1: Two versions of MIB contents can be defined, one for in-band and guard-band, one for stand-alone operation.

Remaining issues about MIB contents

SFN

It was agreed that "the 4 most significant bits of NB-IoT SFN are indicated in NB-MIB". However, whether to include HyperSFN is still an open issue. In RAN1 simulations, we have shown that NB-MIB can support 34-bit payload, and therefore, we can also accommodate partial or the entire HyperSFN in the MIB if necessary. However, the details should based on the input from RAN2.

Observation 2: If necessary, partial or entire HyperSFN can be placed in NB-MIB based on input from RAN2.

Operation mode indication, LTE CRS information, Raster offset, and system BW

Regarding the LTE CRS information, the following are agreed

"

Information to obtain CRS sequence (only needed if same-PCI indicator is set to true), and a same-PCI indicator (to indicate whether or not LTE PCI and NB-IoT PCI are the same) are indicated in NB-MIB Note that this working assumption is related to the working assumption regarding the potential usage of LTE CRS for demodulation FFS whether same-PCI indicator and PRB index are always present, or only in in-band case

"

For the in-band operation, LTE CRS can be used by the NB-IoT devices to improve the channel estimation. As it is agreed that the information to obtain CRS sequence is included in MIB, the MIB needs to include the same-PCI indicator and the PRB index. As we have two different versions of MIB, 1 bit is needed for mode indication. And 1 bit is need for the same-PCI indicator.

For guard-band and in-band operations, the channel raster needs to be indicated. The values of raster offset would be −2.5 kHz, +2.5 kHz, −7.5 kHz, +7.5 kHz. However, only the absolute value need to be signaled, and therefore, only 1 bit is needed. We discuss this in more details in the following paragraph.

The LTE CRS positions in frequency domain can be derived from the PCID, and it is agreed in RAN1 NB-IoT Ad Hoc that "Note that the PCID from NB-SSS and the LTE PCID indicate the same LTE CRS position". Therefore, in order to obtain the exact LTE CRS information, the PRB position of the NB-IoT system needs to be indicated. Notice, the LTE CRS is generated in the manner as follows 3GPP TS 36.211.

The reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

m=0, 1, . . . , $2N_{RB}^{max,DL}-1$ where $n_s$ is the slot number within a radio frame and l is the OFDM symbol number within the slot. The pseudo-random sequence c(i) is defined in clause 7.2. The pseudo-random sequence generator shall be initialised with $c_{init}=2^{10} \cdot (7 \cdot (n_s'+1)+l+1) \cdot (2 \cdot N_{ID}^{cell}+1)+2 \cdot N_{ID}^{cell}+N_{CP}$ at the start of each OFDM symbol where $$n_s' = \begin{cases} 10\lfloor n_s/10 \rfloor + n_s \bmod 2 & \text{for frame structure type 3 when the CRS is part of a DRS} \\ n_s & \text{otherwise} \end{cases}$$

$$N_{CP} = \begin{cases} 1 & \text{for normal } CP \\ 0 & \text{for extended } CP \end{cases}$$

The reference signal sequence $r_{l,n_s}(m)$ shall be mapped to complex-valued modulation symbols $a_{k,l}^{(p)}$ used as reference symbols for antenna port p in slot $n_s$ according to $a_{k,l}^{(p)}=r_{l,n_s}(m')$ where $$k = 6m + (v + v_{shift}) \bmod 6$$

$$l = \begin{cases} 0, N_{sym}^{DL} - 3 & \text{if } p \in \{0, 1\} \\ 1 & \text{if } p \in \{2, 3\} \end{cases}$$

-continued $$m = 0, 1, \ldots, 2 \cdot N_{RB}^{DL} - 1$$

$$m' = m + N_{RB}^{max,DL} - N_{RB}^{DL}$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

The cell-specific frequency shift is given by $v_{shift} = N_{ID}^{cell}$ mod 6.

"

From the ways that the LTE CRSs are generated, we can use a new way to index the PRB which gives the same m', which is used to determine the LTE CRS information. To be more specific, for all the systems, as long as the offset from the middle PRB is known, the LTE CRS can be determined. Therefore, it is only necessary to signal the offset between the NB-IoT PRB to the LTE middle PRB.

Define the new PRB index numbering that starts from the middle as $$n_{PRB}' = _{PRB} - (N_{RB}^{DL} - N_{RB}^{DL} \bmod 2)/2,$$

where $n_{PRE}$ is the original PRB index, and $n_{PRE}'$ is the new indexing being singled, which is relative to the middle LTE PRB. Notice that the sign of $n_{PRE}'$ is related to the sign of the channel raster offset. Therefore, the sign of the channel raster offset can be implicitly derived from $n_{PRE}'$.

Observation 3: It is not necessary to signalled the sign of the channel raster offset as it can be derived from $n_{PRB}'$.

Then m' is still calculated as $m' = m + N_{RB}^{maxDL} - N_{RB}^{DL}$, but with m being substituted by $n = 2 \cdot n_{PRB}' + N_{RB}^{DL} - N_{RB}^{DL}$ mod $2 + \tilde{m}$. Here $\tilde{m} = 0, 1$ for all the cases. As we can see from the calculation, $N_{RB}^{DL}$ is not needed in calculating m', and therefore the LTE system bandwidth does not need to be signalled. Moreover, since the odd and even number of PRBs is related to the absolute value of the channel raster offset, no additional signalling is needed.

An example is given in the appendix to facilitate the understanding of the proposed indexing method. Another advantage of using this method is forward compatibility, if new LTE system bandwidth is defined in the further.

Observation 4: The LTE system bandwidth does not need to be signalled.

Proposal 1: It is proposed to signal the PRB indexing offset from the middle of the LTE system.

Since at most 18 PRBs can be used as anchors for NB-IoT in-band deployment, 5 bits are needed for the indexing. As 5 bits gives 32 different indexing values, some of the values can be used to indicate guard-band operation including the corresponding raster offset.

Observation 5: If only the LTE CRS information is needed, 5 bits are necessary to indicate the offset from middle PRB of the LTE system to the NB-IoT anchor PRB.

Observation 6: Some of the indexing values given by the 5 bits can be used to indicate the guard-band operation including the corresponding raster offset.

The number of CRS ports

The number of LTE CRS ports is agreed to be indicated in MIB. However, this field can be re-used for stand-alone. The current understanding is that for stand-alone operation in release 13, only single antenna is supported. However, in later releases, maybe two antennas can also be used for stand-alone operation, e.g., in the case of deploying NB-IoT system with low power nodes.

Proposal 2: The 1 bit LTE CRS port indication field can be re-used for stand-alone mode for forward compatibility.

Other Issues

During the discussion in the RAN1#84, some companies pointed out the issue of enabling frequency tracking in the current NPBCH design. The current NPBCH design allows frequency tracking between every 10 ms. This is good enough for NB-IoT devices experiencing slow varying channels. The NPBCH design in eMTC uses OFDM symbol repetitions to enable frequency tracking within a subframe. Similar design can also be used in NB-IoT system to enable better frequency tracking.

Observation 7: OFDM symbol repetitions within a subframe of NPBCH can be considered to offer better frequency tracking for NPBCH decoding.

CONCLUSIONS

Table 1 and Table 2 give an estimation of the MIB content and size of each filed. As we can see, in total 17 bits are needed in the MIB for stand-alone operation, and in total 24 bits are needed in the MIB for guard-band and in-band operation.

TABLE 1

MIB content stand-alone

| Field | Size (bits) |
|---|---|
| SFN | 4 |
| Operation mode | 1, to indicate whether it is stand-alone or not. |
| The number of antenna ports | 1, reserved for further releases. |
| FDD/TDD indication (reserved for future use) | (1) |
| SIB1 scheduling info. and TBS | 4 |
| Access barring info. | Estimated to be 1 (Decision should be made in RAN2) |
| Value tag indicate system info change | Estimated to be 5 (Decision should be made in RAN2) |
| Total Size | Estimated to be 17 |

TABLE 2

MIB content in-band and guard-band

| Field | Size (bits) |
|---|---|
| SFN | 4 |
| Operation mode | 1, to indicate whether it is stand-alone or not. |
| PRB index for in-band operation | 5, including indication of guar-band operation |
| Channel raster offset | 1 |
| The number of CRS ports | 1 |
| Same PCI indication | 1 |
| FDD/TDD indication (reserved for future use) | (1) |
| SIB1 scheduling info. and TBS | 4 |
| Access barring info. | Estimated to be 1 (Decision should be made in RAN2) |

TABLE 2-continued

MIB content in-band and guard-band

| Field | Size (bits) |
|---|---|
| Value tag indicate system info change | Estimated to be 5 (Decision should be made in RAN2) |
| Total Size | Estimated to be 24 |

Based on the discussion above, we have the following proposals and observations.

Proposal 1: It is proposed to signal the PRB indexing offset from the middle of the LTE system.

Proposal 2: The 1 bit LTE CRS port indication field can be re-used for stand-alone mode for forward compatibility.

Observation 1: Two versions of MIB contents can be defined, one for in-band and guard-band, one for stand-alone operation.

Observation 2: If necessary, partial or entire HyperSFN can be placed in NB-MIB based on input from RAN2.

Observation 3: It is not necessary to signalled the sign of the channel raster offset as it can be derived from $n_{PRB}'$.

Observation 4: The LTE system bandwidth does not need to be signalled.

Observation 5: If only the LTE CRS information is needed, 5 bits are necessary to indicate the offset from middle PRB of the the LTE system to the NB-IoT anchor PRB.

Observation 6: Some of the indexing values given by the 5 bits can be used to indicate the guard-band operation including the corresponding raster offset.

Observation 7: OFDM symbol repetitions within a sub-frame of NPBCH can be considered to offer better frequency tracking for NPBCH decoding.

REFERENCES

[1] R1-161548, "RAN1 agreements for Rel-13 NB-IoT", source WI rapporteur (Ericsson), RAN1#84, 15-19 Feb. 2016, Malta.
[2] R1-160082, NB-IoT Channel Raster, source Ericsson, 3GPP TSG-RAN1 NB-IOT Ad Hoc 18-20 Jan. 2016, Budapest, Hungary
[3] R1-160022, Channel raster design, source Huawei, HiSilicon, 3GPP TSG-RAN1 NB-IOT Ad Hoc 18-20 Jan. 2016, Budapest, Hungary
[4] R1-160080, NB-IoT—Synchronization Channel Evaluations, source Ericsson, 3GPP TSG-RAN1 NB-IOT Ad Hoc 18-20 Jan. 2016, Budapest, Hungary
[5] R1-160021, Synchronization signal evaluation, source Huawei, HiSilicon, 3GPP TSG-RAN1 NB-IOT Ad Hoc 18-20 Jan. 2016, Budapest, Hungary
[6] RP-152284, "New Work Item: Narrowband IoT (NB-IoT)," sources Huawei and HiSilicon, RAN #70.
[7] 3GPP TS 36.211.
[8] R1-160918, "MIB Contents for NB-IoT", source InterDigital, RAN1#84, 15-19 Feb. 2016, Malta.

EXAMPLE

In this example, we use 10 MHz LTE system as an example to illustrate the proposed indexing method. The legacy LTE PRB indexing is from 0 to 49, and the indexing is from low frequency to high frequency. We choose PRB 35, which is one of the possible anchor positions of deploying NB-IoT carrier.

For PRB 35, following [7], we have $$m = 2 \cdot 35 + [0,1] = 70, 71.$$

Then we have $$m' = m + N_{RB}^{max,DL} - N_{RB}^{DL} = [70,71] + 110 - 50 = 130, 131.$$

The new indexing maps PRB 35 to the following offset from the LTE middle PRB as $$n_{PRB}' = n_{PRB} - (N_{RB}^{DL} - N_{RB}^{DL} \bmod 2)/2 = 35 - (50 - 50 \bmod 2)/2 = 10$$

Therefore, $$m' = n + N_{RB}^{max,DL} - N_{RB}^{DL} = 2 \cdot n_{PRB}' + N_{RB}^{DL} - N_{RB}^{DL} \bmod 2 + \tilde{m} + N_{RB}^{max,DL} - N_{RB}^{DL} = 2 \cdot 10 + N_{RB}^{DL} - 50 \bmod 2 + [0,1] + 110 - N_{RB}^{DL} = 130, 131$$

As we can see, with only indicating the offset, i.e., 10 PRBs from the middle, the same m' can be obtained without knowing the system bandwidth $N_{RB}^{DL}$.

Figure 12:
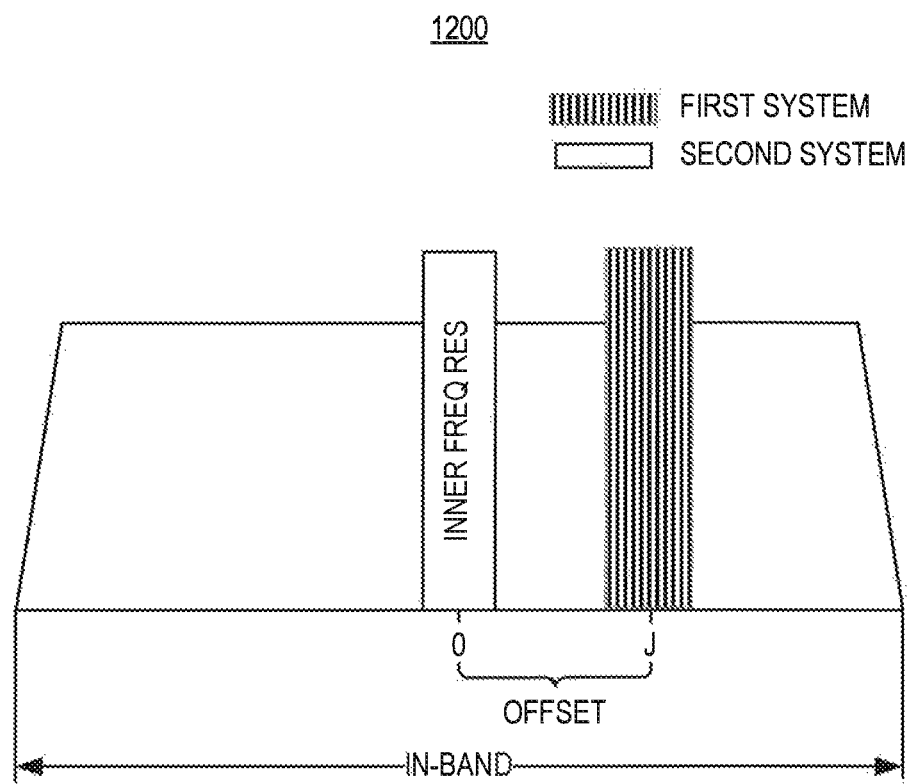
FIG. 12 illustrates a system for deploying a frequency resource in a wireless communication system in accordance with various aspects as described herein.

FIG. 12 illustrates a system for deploying a frequency resource in a wireless communication system in accordance with various aspects as described herein. The frequency Resource on which the first wireless communication network is deployed is marked with stripes and the frequency resources on which the second wireless communication system such as LTE are marked with white. The frequency resource is offset the inner frequency resource in an in-band deployment.

Figure 13:
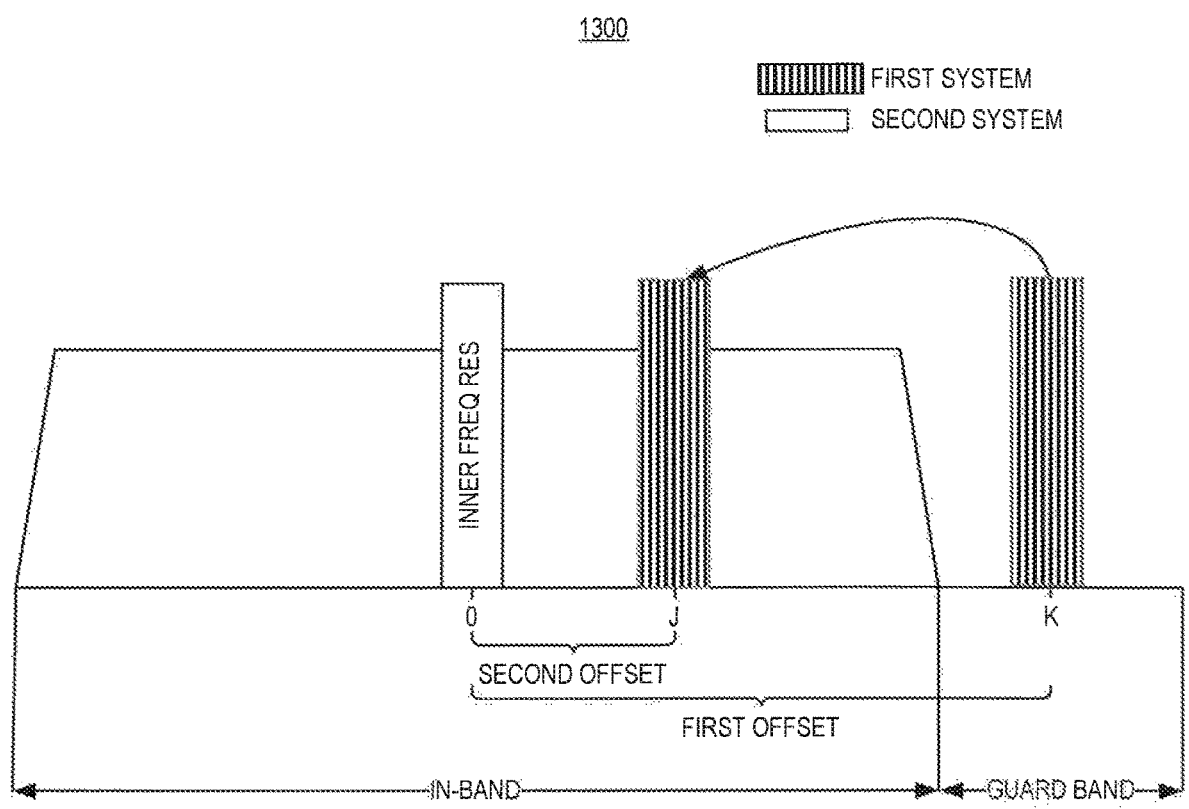
FIG. 13 illustrates a system for deploying a frequency resource in a wireless communication system in accordance with various aspects as described herein.

FIG. 13 illustrates a system for deploying a frequency resource in a wireless communication system in accordance with various aspects as described herein. A first frequency resource on which the first wireless communication network is deployed is offset into the guard band of the second wireless communication system. The first frequency resource is pointing to a second frequency, on which the first wireless communication network is deployed resource, in-band of the bandwidth.

Figure 14:
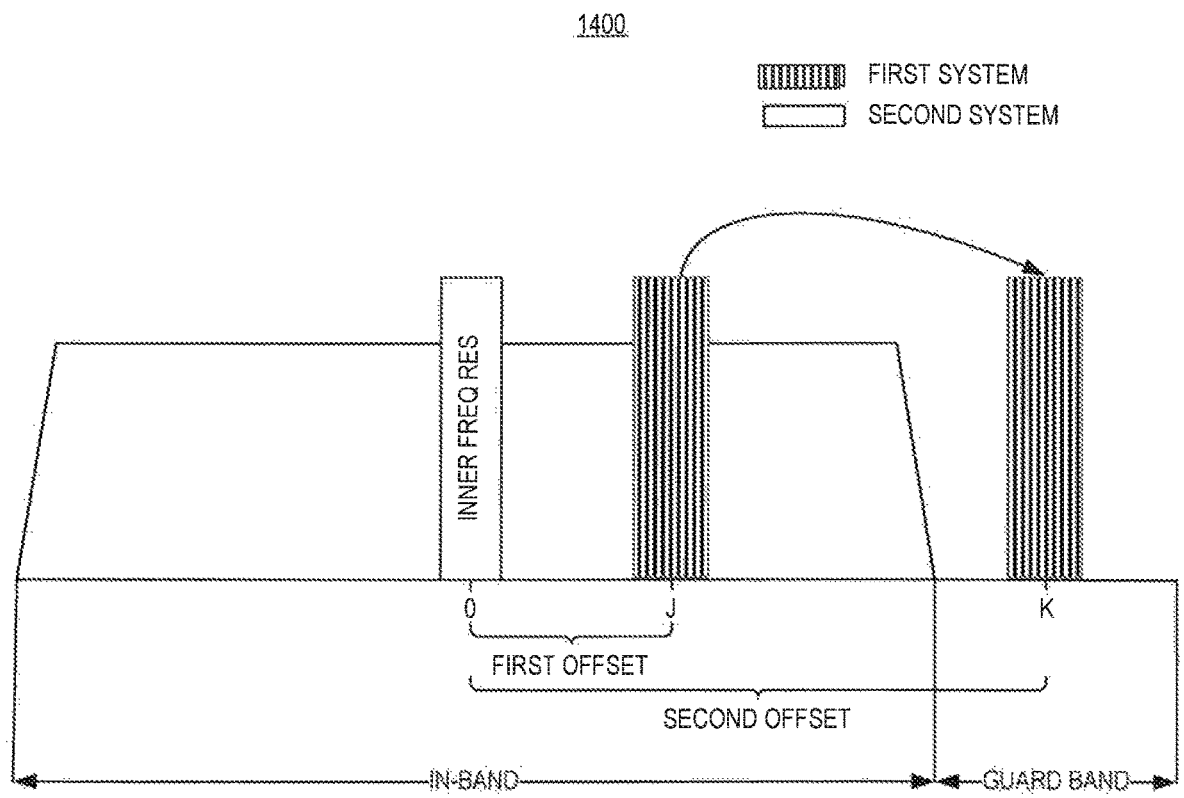
FIG. 14 illustrates a system for deploying a frequency resource in a wireless communication system in accordance with various aspects as described herein.

FIG. 14 illustrates a system for deploying a frequency resource in a wireless communication system in accordance with various aspects as described herein. A first frequency resource on which the first wireless communication network is deployed is offset in-band of the second wireless communication system. The first frequency resource is pointing to a second frequency, on which the first wireless communication network is deployed resource, into the guard band of the bandwidth.

Figure 15:
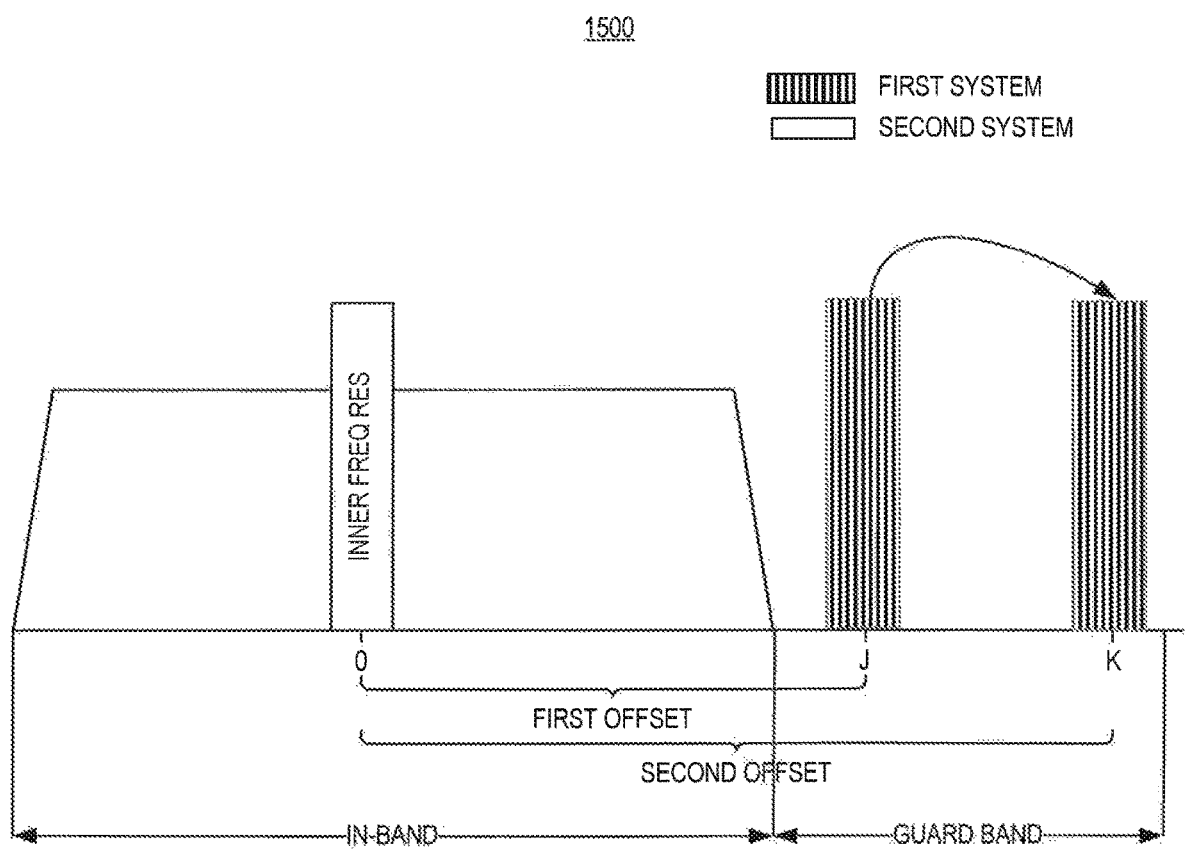
FIG. 15 illustrates a system for deploying a frequency resource in a wireless communication system in accordance with various aspects as described herein.

FIG. 15 illustrates a system for deploying a frequency resource in a wireless communication system in accordance with various aspects as described herein. A first frequency resource, being an anchor frequency resource, on which the first wireless communication network is deployed is offset into the guard band of the second wireless communication system. The first frequency resource is pointing to a secondary frequency resource, on which the first wireless communication network is deployed resource, also in the guard band of the bandwidth.

Figure 16:
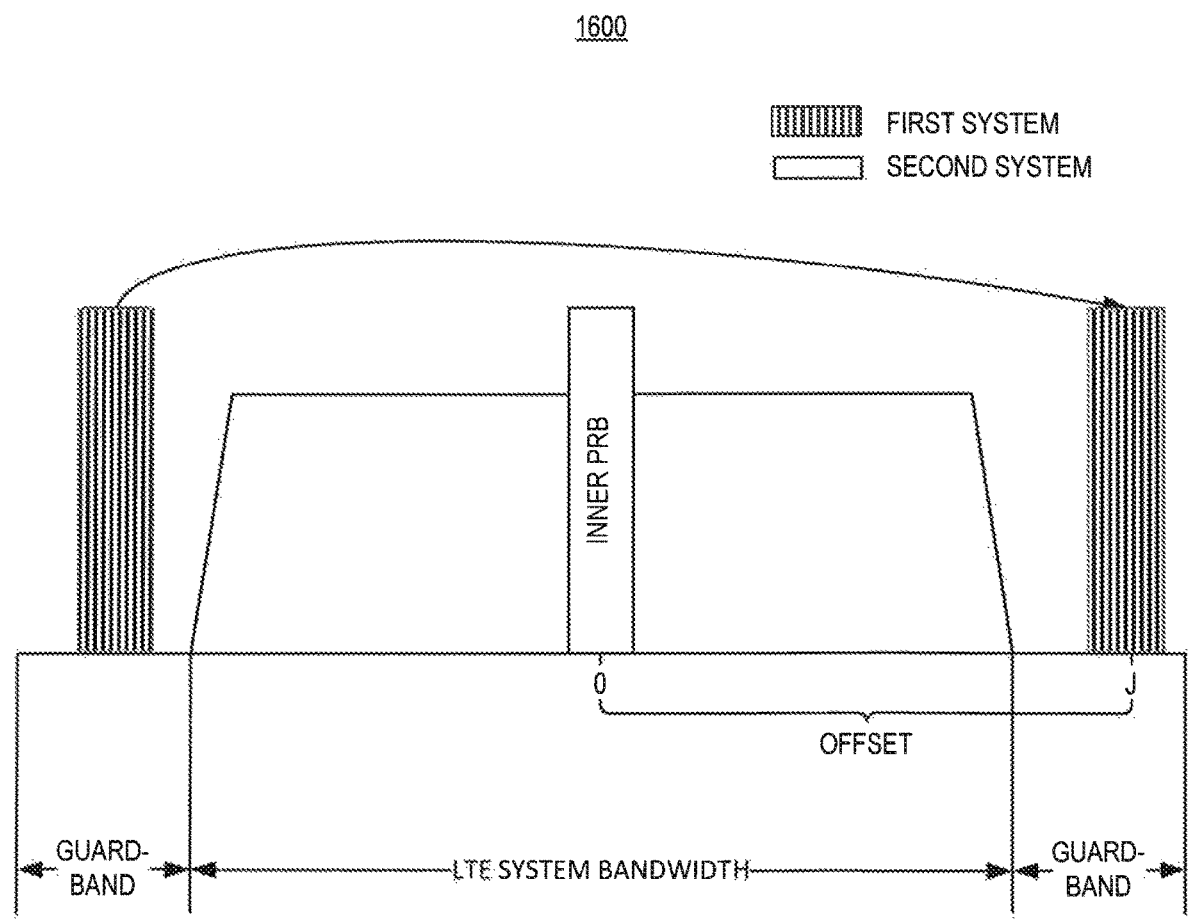
FIG. 16 illustrates a system for deploying a frequency resource in a wireless communication system in accordance with various aspects as described herein.

FIG. 16 illustrates a system for deploying a frequency resource in a wireless communication system in accordance with various aspects as described herein. A first frequency resource, being an anchor PRB, on which the first wireless communication network is deployed is offset into the guard band of the second wireless communication system. The first frequency resource is pointing to a secondary PRB, on which the first wireless communication network is deployed resource, in an opposite guard band of the bandwidth.

Figure 17:
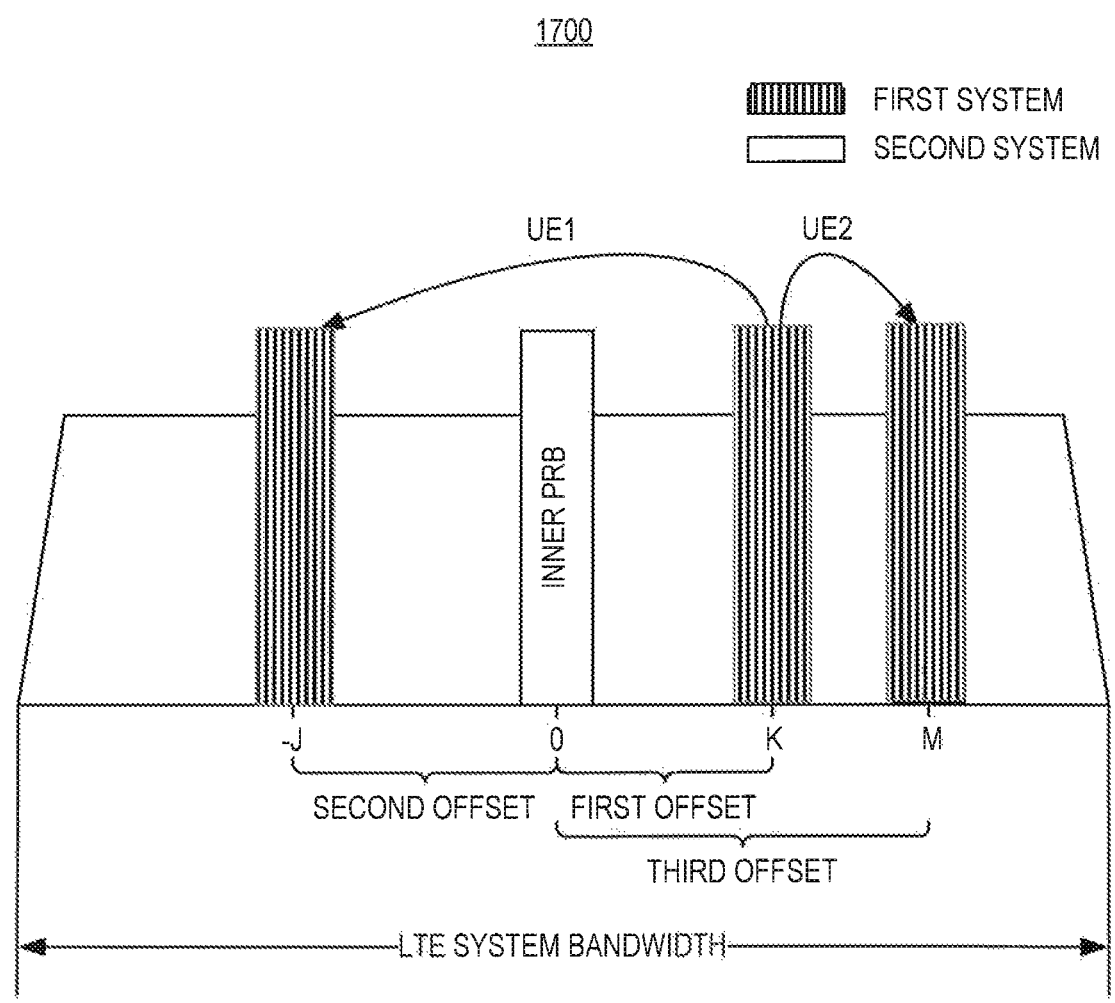
FIG. 17 illustrates a system for deploying a frequency resource in a wireless communication system in accordance with various aspects as described herein.

FIG. 17 illustrates a system for deploying a frequency resource in a wireless communication system in accordance with various aspects as described herein. A first frequency resource, being an anchor PRB, on which the first wireless communication network is deployed is offset in-band of the second wireless communication system. The first frequency resource is pointing to a secondary PRB, on which the first wireless communication network is deployed resource for a first UE, also in-band of the bandwidth. Further, the first frequency resource is pointing to a secondary PRB, on which the first wireless communication network is deployed resource for a secondary UE, also in-band of the bandwidth. All are the PRBs are offset relative the inner frequency resource.

Some embodiments are further disclosed herein.

In one embodiment, a method performed by a wireless device may determine a frequency resource on which a first wireless communication system is deployed. The method may include obtaining information indicating an offset between a frequency resource on which the first wireless communication system is deployed and an inner frequency resource on which the second wireless communication system is deployed. In the frequency domain, the second wireless communication system may be deployed on at least one higher frequency resource above the inner frequency resource and at least one lower frequency resource below the inner frequency resource. The method may also include determining, based on the offset and the inner frequency resource, the frequency resource on which the first wireless communication system is deployed.

In another embodiment, the method may include comprising transmitting or receiving on the determined frequency resource.

In another embodiment, the inner frequency resource may be a middle frequency resource.

In another embodiment, the second wireless communication system may be deployed on an odd number of frequency resources. Further, the inner frequency resource may be the middlemost frequency resource amongst the odd number of frequency resources. The middlemost frequency resource may have the same number of frequency resources on either side of the middlemost frequency resource. Further, frequencies corresponding to the middle frequency resource may be between frequencies corresponding to the lower frequency resource and frequencies corresponding to the upper frequency resource.

In another embodiment, the second wireless communication system may be deployed on an even number of frequency resources. Further, the inner frequency resource may be one of the two middlemost frequency resources amongst the even number of frequency resources.

In another embodiment, the method may include determining one or more other frequency resources on which the first wireless communication system is deployed.

In another embodiment, the step of determining the frequency resource on which the first wireless communication system is deployed may be irrespective of a bandwidth of the second wireless communication system.

In another embodiment, the step of obtaining may include receiving the information from a network node.

In another embodiment, the determined frequency resource may be an anchor frequency resource on which random access is performed for the first wireless communication system.

In another embodiment, the anchor frequency resource may be a physical resource block (PRB) that contains information corresponding to at least one of a synchronization sequence, a broadcast channel and an information block.

In another embodiment, the synchronization sequence may be related to at least one of an NB-IoT Primary Synchronization Sequence (NB-PSS) and an NB-IoT Secondary Synchronization Sequence (NB-SSS).

In another embodiment, the broadcast channel may be related to a NB-IoT Physical Broadcast Channel (NB-PBCH).

In another embodiment, the information block may be related to a System Information Block (SIB) transmission.

In another embodiment, the first wireless communication system may be deployed on an anchor frequency resource for performing random access and on one or more non-anchor frequency resources for a data connection. Further, the determined frequency resource may be a non-anchor frequency resource.

In another embodiment, the wireless device may be a user equipment (UE).

In another embodiment, the frequency resource may be a range of contiguous frequencies.

In another embodiment, the frequency resource may be a physical resource block (PRB).

In another embodiment, the frequency resource of the first wireless communication system may be deployed in at least one of an in-band or a guard band of the second wireless communication system.

In another embodiment, the frequency resource of the first wireless communication system may be deployed outside any band of the second wireless communication system.

In one embodiment, a wireless device may be configured to obtain information indicating an offset between a frequency resource on which the first wireless communication system is deployed and an inner frequency resource on which the second wireless communication system is deployed. Further, in the frequency domain, the second wireless communication system may be deployed on at least one higher frequency resource above the inner frequency resource and at least one lower frequency resource below the inner frequency resource. The wireless device may also determine, based on the offset and the inner frequency resource, the frequency resource on which the first wireless communication system is deployed.

In one embodiment, a wireless device may include means for obtaining information indicating an offset between a frequency resource on which the first wireless communication system is deployed and an inner frequency resource on which the second wireless communication system is deployed. Further, in the frequency domain, the second wireless communication system may be deployed on at least one higher frequency resource above the inner frequency resource and at least one lower frequency resource below the inner frequency resource. The wireless device may also include means for determining, based on the offset and the inner frequency resource, the frequency resource on which the first wireless communication system is deployed.

In one embodiment, a computer program comprising instructions which, when executed by at least one processor of a wireless device, causes the wireless device to perform the method of any of the embodiments herein.

In another embodiment, a carrier may contain the computer program corresponding to the wireless device to perform the method of any of the embodiments herein. Further, the carrier may be one of an electronic signal, optical signal, radio signal, or computer readable storage medium.

In one embodiment, a method performed by a network node may assign a frequency resource on which a first wireless communication system is deployed. The method may include determining an offset between the frequency resource on which the first wireless communication system is deployed and an inner frequency resource on which the second wireless communication system is deployed. Further, in the frequency domain, the second wireless communication system may be deployed on at least one higher frequency resource above the inner frequency resource and at least one lower frequency resource below the inner frequency resource. The method may also include generating information indicating the offset to enable a wireless device to determine the frequency resource.

In another embodiment, the method may include transmitting the information to the wireless device.

In another embodiment, the method may include determining one or more other frequency resources on which the first wireless communication system is deployed.

In another embodiment, the step of determining the frequency resource on which the first wireless communication system is deployed may be irrespective of a bandwidth of the second wireless communication system.

In another embodiment, the method may include receiving a signal on the frequency resource on which the first wireless communication system is deployed in-band or in the guard band of the second wireless communication system.

In one embodiment, a network node may be configured to determine an offset between the frequency resource on which the first wireless communication system is deployed and an inner frequency resource on which the second wireless communication system is deployed. Further, in the frequency domain, the second wireless communication system may be deployed on at least one higher frequency resource above the inner frequency resource and at least one lower frequency resource below the inner frequency resource. The network node may be further configured to generate information indicating the offset to enable a wireless device to determine the frequency resource.

In one embodiment, a network node may include means for determining the offset between a frequency resource on which the first wireless communication system is deployed and an inner frequency resource on which the second wireless communication system is deployed. Further, in the frequency domain, the second wireless communication system may be deployed on at least one higher frequency resource above the inner frequency resource and at least one lower frequency resource below the inner frequency resource. The network node may also include means for generating information indicating the offset to enable a wireless device to determine the frequency resource.

In one embodiment, a computer program comprising instructions which, when executed by at least one processor of a network node, may cause the network node to perform the method of any of the embodiments herein.

In another embodiment, a carrier may contain the computer program corresponding to the network node to perform the method of any of the embodiments herein. Further, the carrier may be one of an electronic signal, optical signal, radio signal, or computer readable storage medium.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein such as functions and modules may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device in a first wireless communication system that is deployed on a physical resource block (PRB), the method comprising the wireless device:
   receiving information indicating a PRB offset and a corresponding channel raster offset; wherein the channel raster offset is an offset in frequency between a channel raster, used by the wireless device in a cell search process, and the PRB; wherein the PRB offset indicates an offset between the PRB and a middle PRB on which a second wireless communication system is deployed; wherein, in the frequency domain, the second wireless communication system is deployed on at least one higher PRB above the middle PRB and at least one lower PRB below the middle PRB; and
   determining, based on the received information, an adjustment in frequency applicable for the PRB on which the first wireless communication system is deployed.

2. The method of claim 1, further comprising the wireless device receiving, during the cell search process using the channel raster, a synchronization signal of the first wireless communication system.

3. The method of claim 1, wherein the received information enables the wireless device to determine, based on the PRB offset, cell-specific reference signal (CRS) information of the second communication system and to use this information for channel estimation in the first wireless communication system.

4. The method of claim 1, wherein the receiving the information comprises receiving a master information block (MIB) of the first wireless communication system, which MIB comprises five bits indicating the PRB offset and the corresponding channel raster offset.

5. The method of claim 1, wherein the information comprises an index indicating the PRB offset and the corresponding channel raster offset.

6. A method performed by a network node in a first wireless communication system that is deployed on a physical resource block (PRB), the method comprising the network node:
   transmitting information indicating a PRB offset and a corresponding channel raster offset;
   wherein the channel raster offset is an offset in frequency between a channel raster, used by the wireless device in a cell search process, and the PRB;
   wherein the PRB offset indicates an offset between the PRB and a middle PRB on which a second wireless communication system is deployed; and
   wherein, in the frequency domain, the second wireless communication system is deployed on at least one higher PRB above the middle PRB and at least one lower PRB below the middle PRB.

7. The method of claim 6, further comprising the network node transmitting a synchronization signal to be received by a wireless device during the cell search process.

8. The method of claim 6, further comprising the network node:
   determining the channel raster offset and the PRB offset for the PRB on which the first wireless communication system is deployed; and
   generating the information indicating the determined PRB offset and the corresponding channel raster offset.

9. The method of claim 6, wherein the transmitting the information comprises transmitting a master information block (MIB) of the first wireless communication system, which MIB comprises five bits indicating the PRB offset and the corresponding channel raster offset.

10. The method of claim 6, wherein the information comprises an index indicating the PRB offset and the corresponding channel raster offset.

11. A wireless device for a first wireless communication system that is deployed on a physical resource block (PRB), the wireless device comprising: processing circuitry; memory containing instructions executable by the processing circuitry, which, when executed by the processing circuitry, causes the wireless device to:
   receive information indicating a PRB offset and a corresponding channel raster offset;
   wherein the channel raster offset is an offset in frequency between a channel raster, used by the wireless device in a cell search process, and the PRB;
   wherein the PRB offset indicates an offset between the PRB and a middle PRB on which a second wireless communication system is deployed;
   wherein, in the frequency domain, the second wireless communication system is deployed on at least one higher PRB above the middle PRB and at least one lower PRB below the middle PRB; and
   determine, based on the received information, an adjustment in frequency applicable for the PRB on which the first wireless communication system is deployed.

12. The wireless device of claim 11, wherein the instructions are such that the wireless device is operative to receive, during the cell search process using the channel raster, a synchronization signal of the first wireless communication system.

13. The wireless device of claim 11, wherein receiving the information indicating the PRB offset and the corresponding channel raster offset enables the wireless device to determine, based on the PRB offset, cell-specific reference signal (CRS) information of the second communication system; and to use this information for channel estimation in the first wireless communication system.

14. The wireless device of claim 11, wherein the instructions are such that the wireless device is operative to receive the information receiving a master information block (MIB) of the first wireless communication system, which MIB comprises five bits indicating the PRB offset and the corresponding channel raster offset.

15. The wireless device of claim 11, wherein the information comprises an index indicating the PRB offset and the corresponding channel raster offset.

16. A network node for a first wireless communication system that is deployed on a physical resource block (PRB), the network node comprising: processing circuitry;
   memory containing instructions executable by the processing circuitry, which, when executed by the processing circuitry, causes the network node to:
   transmit information indicating a PRB offset and a corresponding channel raster offset;
   wherein the channel raster offset is an offset in frequency between a channel raster, used by a wireless device in a cell search process, and the PRB;
   wherein the PRB offset indicates an offset between the PRB and an middle PRB on which a second wireless communication system is deployed; and
   wherein, in the frequency domain, the second wireless communication system is deployed on at least one higher PRB above the middle PRB and at least one lower PRB below the middle PRB.

17. The network node of claim 16, wherein the instructions are such that the network node is operative to transmit a synchronization signal to be received by the wireless device during the cell search process.

18. The network node of claim 16, wherein the instructions are such that the network node is operative to:
   determine the channel raster offset and the PRB offset for the PRB on which the first wireless communication system is deployed; and
   generate the information indicating the determined PRB offset and the corresponding channel raster offset.

19. The network node of claim 16, wherein the instructions are such that the network node is operative to transmit the information by transmitting a master information block (MIB) of the first wireless communication system, which MIB comprises five bits indicating the PRB offset and the corresponding channel raster offset.

20. The network node of claim 16, wherein the information comprises an index indicating the PRB offset and the corresponding channel raster offset.

21. A non-transitory computer readable recording medium storing a computer program product for controlling a wireless device in a first wireless communication system that is deployed on a physical resource block (PRB), the computer program product comprising software instructions which, when run on processing circuitry of the wireless device, causes the wireless device to:
   receive information indicating a PRB offset and a corresponding channel raster offset; wherein the channel raster offset is an offset in frequency between a channel raster, used by the wireless device in a cell search process, and the PRB; wherein the PRB offset indicates an offset between the PRB and a middle PRB on which a second wireless communication system is deployed; wherein, in the frequency domain, the second wireless communication system is deployed on at least one higher PRB above the middle PRB and at least one lower PRB below the middle PRB; and
   determine, based on the received information, an adjustment in frequency applicable for the PRB on which the first wireless communication system is deployed.

22. A non-transitory computer readable recording medium storing a computer program product for controlling a network node in a first wireless communication system that is deployed on a physical resource block (PRB), the computer program product comprising software instructions which, when run on processing circuitry of the network node, causes the network node to:
   transmit information indicating a PRB offset and a corresponding channel raster offset;
   wherein the channel raster offset is an offset in frequency between a channel raster, used by the wireless device in a cell search process, and the PRB;
   wherein the PRB offset indicates an offset between the PRB and a middle PRB on which a second wireless communication system is deployed; and
   wherein, in the frequency domain, the second wireless communication system is deployed on at least one higher PRB above the middle PRB and at least one lower PRB below the middle PRB.

\* \* \* \* \*

UNITED STATES PATENT AND TRADEMARK OFFICE
CERTIFICATE OF CORRECTION

Page 1 of 2

PATENT NO. : 10,743,186 B2
APPLICATION NO. : 16/085787
DATED : August 11, 2020
INVENTOR(S) : Sui et al.

It is certified that error appears in the above-identified patent and that said Letters Patent is hereby corrected as shown below:

In the Specification

In Column 26, Line 51, delete "$c_{init}=2^{10} \cdot (7 \cdot (n_s'+1)+l+1) \cdot (2 \cdot N_{ID}^{cell}+1)+2 \cdot N_{ID}^{cell}+N_{CP}$" and insert -- $c_{init}=2^{10} \cdot (7 \cdot (n_s'+1)+l+1) \cdot (2 \cdot N_{ID}^{cell}+1)+2 \cdot N_{ID}^{cell}+N_{CP}$ --, therefor.

In Column 27, Line 47, delete "$m'=N_{RB}^{maxDL}-N_{RB}^{DL}$," and insert -- $m'=m+N_{RB}^{maxDL}-N_{RB}^{DL}$, --, therefor.

In Column 27, Line 58, delete "$n$." and insert -- $n_s$. --, therefor.

In Column 27, Line 65, delete "$n_{PRE}$" and insert -- $n_{PRB'}$ --, therefor.

In Column 27, Line 66, delete "$n_{PRE}$" and insert -- $n_{PRB'}$ --, therefor.

In Column 28, Line 3, delete "$n_{PRE'}$." and insert -- $n_{PRB'}$. --, therefor.

In Column 30, Lines 44-45, delete "$c_{init}=2^{10} \cdot (7 \cdot (n_s'+1)+l+1) \cdot (2 \cdot N_{ID}^{cell}+1)+2 \cdot N_{ID}^{cell}+N_{CP}$" and insert -- $c_{init}=2^{10} \cdot (7 \cdot (n_s'+1)+l+1) \cdot (2 \cdot N_{ID}^{cell}+1)+2 \cdot N_{ID}^{cell}+N_{CP}$ --, therefor.

In Column 30, Lines 64-66, delete "$l = \begin{cases} 0, N_{sym}^{DL}-3 & \text{if } p \in \{0, 1\} \\ 1 & \text{if } p \in \{2, 3\} \end{cases}$," and insert -- $l = \begin{cases} 0, N_{sym}^{DL}-3 & \text{if } p \in \{0, 1\} \\ 1 & \text{if } p \in \{2, 3\} \end{cases}$ --, therefor.

In Column 31, Line 32, delete "$n_{PRB}'=_{PRB}-(N_{RB}^{DL}-N_{RB}^{DL} \mod 2)/2$," and insert -- $n_{PRB}'=n_{PRB}-(N_{RB}^{DL}-N_{RB}^{DL} \mod 2)/2$, --, therefor.

In Column 31, Line 34, delete "$n_{PRE}$" and insert -- $n_{PRB}$ --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*

In Column 31, Line 34, delete "$n_{PRE}$" and insert -- $n_{PRB'}$ --, therefor.

In Column 31, Line 36, delete "$n_{PRE}$" and insert -- $n_{PRB'}$ --, therefor.

In Column 31, Line 38, delete "$n_{PRE'}$." and insert -- $n_{PRB'}$. --, therefor.

In Column 34, Line 3, delete "m=2.35+[0,1]=7071." and insert -- m=2.35+[0,1]=70,71. --, therefor.